(12) United States Patent
Zbiral et al.

(10) Patent No.: US 11,680,670 B2
(45) Date of Patent: Jun. 20, 2023

(54) COUPLING DEVICE FOR MEDIA-CONDUCTING LINES

(71) Applicant: MANN+HUMMEL GmbH, Ludwigsburg (DE)

(72) Inventors: Robert Zbiral, Marbach (DE); Thomas Jessberger, Asperg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 647 days.

(21) Appl. No.: 16/415,546

(22) Filed: May 17, 2019

(65) Prior Publication Data

US 2019/0271425 A1    Sep. 5, 2019

Related U.S. Application Data

(63) Continuation of application No. PCT/EP2017/079230, filed on Nov. 14, 2017.

(30) Foreign Application Priority Data

Nov. 18, 2016    (DE) .......................... 10 2016 013 752.5

(51) Int. Cl.
*F16L 37/12*  (2006.01)
*F16L 37/088*  (2006.01)
*F16L 37/14*  (2006.01)

(52) U.S. Cl.
CPC ......... *F16L 37/123* (2013.01); *F16L 37/0885* (2019.08); *F16L 37/144* (2013.01)

(58) Field of Classification Search
CPC . F16L 37/0885; F16L 37/1225; F16L 37/144; F16L 2201/10
See application file for complete search history.

(56) References Cited

U.S. PATENT DOCUMENTS

| 3,929,357 | A | | 12/1975 | DeVincent et al. | |
|---|---|---|---|---|---|
| 3,948,548 | A | * | 4/1976 | Voss .................... | F16L 37/0885 285/321 |
| 5,683,117 | A | * | 11/1997 | Corbett ............... | F16L 37/0885 285/305 |
| 6,386,596 | B1 | * | 5/2002 | Olson ................. | F16L 37/0925 285/308 |
| 6,540,263 | B1 | * | 4/2003 | Sausner ................ | F16L 37/144 285/308 |

(Continued)

FOREIGN PATENT DOCUMENTS

| BE | 479098 A | 1/1948 |
|---|---|---|
| CN | 107489840 A | 12/2017 |

(Continued)

*Primary Examiner* — Zachary T Dragicevich
*Assistant Examiner* — Alexander T Rufrano

(57) ABSTRACT

A coupling device for connecting media-conducting lines has a one-part or multi-part first coupling section and a one-part or multi-part second coupling section. At least one locking element is fastened with at least one connecting section to the first coupling section and is provided with one or more locking arc sections extending in a circumferential direction between the first and second coupling sections. The second coupling section has a locking section extending circumferentially at least partially about a circumference of the second coupling section. At least one of the one or more locking arc sections interacts with the locking section.

6 Claims, 19 Drawing Sheets

(56) References Cited

U.S. PATENT DOCUMENTS

| | | | |
|---|---|---|---|
| 7,677,608 B2* | 3/2010 | Takayanagi | F16L 37/144 285/305 |
| 8,430,365 B2* | 4/2013 | Benoit | F16L 5/027 248/74.1 |
| 9,677,699 B2* | 6/2017 | Barthel | F16L 37/1225 |
| 2006/0061096 A1* | 3/2006 | Krause | F16L 37/1225 285/305 |
| 2006/0082145 A1* | 4/2006 | Steveley | F16L 37/144 285/305 |
| 2007/0059972 A1 | 3/2007 | Rigollet et al. | |
| 2007/0273150 A1* | 11/2007 | Tsurumi | F16L 37/144 285/305 |
| 2008/0252070 A1 | 10/2008 | Hartmann | |
| 2008/0279621 A1 | 11/2008 | Chaupin | |
| 2011/0067225 A1 | 3/2011 | Bassaco | |
| 2012/0280489 A1 | 11/2012 | Bundy et al. | |
| 2013/0140808 A1 | 6/2013 | Hutchinson | |
| 2014/0338773 A1 | 11/2014 | French | |
| 2021/0301960 A1* | 9/2021 | Barthel | F16L 37/144 |

FOREIGN PATENT DOCUMENTS

| | | |
|---|---|---|
| DE | 2444993 A1 | 4/1976 |
| DE | 102010035027 A1 | 2/2012 |
| KR | 20140107886 A | 9/2014 |
| WO | 2012022489 A2 | 2/2012 |
| WO | 2018104616 A1 | 6/2018 |

* cited by examiner

COUPLING DEVICE FOR MEDIA-CONDUCTING LINES

CROSS-REFERENCE TO RELATED APPLICATIONS

This application is a continuation application of international application No. PCT/EP2017/079230 having an international filing date of 14 Nov. 2017 and designating the United States, the international application claiming a priority date of 18 Nov. 2016 based on prior filed German patent application No. 10 2016 013 752.5, the entire contents of the aforesaid international application and the aforesaid German patent application being incorporated herein by reference.

BACKGROUND OF THE INVENTION

The invention concerns a coupling device for connecting media-conducting lines, in particular for producing a quasi-rigid connection of media-conducting lines.

EP 2 501 979 B1 discloses a quick coupling for ducts in the form of a connecting device for a plug-in section, comprising an annular outer groove, of a hose-shaped or tubular line or of a socket. The connecting device comprises a housing into which the plug-in section can be inserted. The connecting device comprises also a locking element with which the plug-in section inserted into the housing can be locked on the housing. The anti-slide securing device of the locking element is realized in the pull-out direction externally on the housing. For this purpose, a securing device is proposed that is externally arranged on the housing. By arranging such a securing device externally on the housing, a simplified accessibility is provided. The securing device comprises an outer stop arranged externally on the housing which is positioned in the preassembled state opposite an externally positioned end of the locking element in the pull-out direction. Such an outer stop effects a securing action against displacement of the locking element in the pull-out direction.

SUMMARY OF THE INVENTION

It is an object of the invention to provide an inexpensive and easily mountable coupling device that is in particular suitable for quasi rigid media-conducting lines.

The aforementioned object is solved with a coupling device, with an outer coupling section and an inner coupling section as well as at least one locking element that is fastened with at least one connecting section to one of the coupling sections and is extending with one or a plurality of locking arc sections in circumferential direction between the two coupling sections.

Beneficial configurations and advantages of the invention result from the further claims, the description, and the drawing.

A coupling device for connecting media-conducting lines is proposed, with a one-part or multi-part outer coupling section and a one-part or multi-part inner coupling section as well as at least one locking element that, by means of at least one connecting section, is fastened to one of the coupling sections and extends with one or a plurality of locking arc sections in circumferential direction between the two coupling sections. At least one of the locking arc sections interacts with a corresponding locking section that is extending circumferentially at least partially on the circumference of the other one of the coupling sections.

Optionally, two, three or more locking elements can be provided. Each one of the locking elements can be fastened with at least one connecting section to one of the coupling sections. The at least one locking element can be symmetrical or unsymmetrical relative to its at least one connecting section or to its plurality of connecting sections.

The locking element can be fixedly connected to or embodied as one piece with one of the coupling sections or inserted as a separate component into the coupling section.

The individual components of the coupling device, such as coupling sections and locking element, can be embodied of synthetic material, in particular of a glass fiber-filled synthetic material. In particular, for example, polyamide (PA) with different glass fiber proportions can be employed, for example, PA GF30, PA GF50 or PA GF60, i.e., with 30%, 50%, or 60% glass fiber proportions, depending on the desired strength. Alternatively, it is also possible to employ, for example, an inner coupling section which is made of metal. The coupling sections can be embodied as circumferentially closed one-part components but can also be embodied at the circumference in multiple parts, approximately shell-like.

The coupling device according to the invention is particularly suitable for producing a rigid or quasi rigid connection, for example, in case of charge air lines in motor vehicles or of connections subjected in particular high temperature and pressure loading. The coupling device can compensate easily the movements produced during installation or by slight positional changes between connecting points.

In particular, when providing two coupling sections, for example, in a duct, it is possible to compensate movements between connecting elements in case of rigid connections with only minimal deviations. The coupling sections can be end sections of two ducts that are to be connected to each other.

The coupling device according to the invention comprises at least one locking element that is arranged, for example, on the outer coupling section, which comprises one or a plurality of locking arc sections which extend in circumferential direction about the inner coupling section. For example, to both sides of a connecting section arranged on the coupling section, one locking arc section of the locking element can be extending. When the inner coupling section is inserted into the outer coupling section, the two locking arc sections are expanded outwardly and, upon further insertion of the inner coupling section, can lock in at least one partially circumferentially extending locking section of the inner coupling section. In this way, the coupling device is locked and the inner coupling section can no longer be pulled out of the outer coupling section simply by pulling.

For this purpose, the locking arc sections are elastic but bending resistant so that they can be reversibly expanded and, without pressure being applied onto a possible actuation element, can snap back into their initial position. In this way, a simple locking mechanism without additional separate locking elements can be realized. The locking element can also be designed without separate spring. The coupling device cannot be detached by only pulling in axial direction or by tilting the coupling sections relative to each other.

The locking element is connected by the connecting section to the coupling section and can be produced together with it and/or can even be comprised of the same material. Locking element and coupling section can be formed as one piece. Alternatively, it is however also possible to produce the locking element by an injection molding process together with the coupling section. The locking element can be comprised of a different material than the coupling section. In particular, the locking element can be produced by a two-component process together with the coupling section and both can be comprised of different materials. For a stable connection, it can be sufficient when the locking arc sections engage only about a portion of the circumference of the inner coupling section.

The coupling device can advantageously be embodied to be compatible with a VDA standard coupling for pipe connections (VDA: abbreviation for Verband der Automobilindustrie; German Association of the Automotive Industry).

The locking element can be arranged with its locking arc sections on the outer coupling section and can glide across the inner coupling section and lock at its locking section. Alternatively, the locking element can be arranged on the inner coupling section and can be inserted into the outer coupling section by compression and then lock in a locking section of the outer coupling section in that, due to its elastic properties, it can expand again upon reaching the shoulder of the locking section. In this way, a safe locking action of the coupling device can be achieved also.

According to a further advantageous embodiment, at least one actuating element for opening the locking arc sections can be provided on the locking element. Then the locking element can be easily opened from the exterior. By force introduction into the actuation element which is arranged on the locking arc section, the locking arc section can be expanded in the circumferential direction without additional tool so that the locking arc section can be released from the locking section and the inner coupling section can be pulled out again from the outer coupling section.

According to a further advantageous embodiment, the locking element can be integrally formed on one of the coupling sections. Coupling section and locking element can be expediently embodied together as one piece so that they can be produced together, for example, by an injection molding process. For this purpose, the locking element can be integrally formed by means of the connecting section to the coupling section in order to be able to produce both elements in an injection mold. Coupling section and locking element can be comprised of the same or of different materials. In this way, the coupling device can be produced cost-efficiently. Also, the locking element is connected captively and stably in this way with the coupling element. It is particularly advantageous that the at least one locking element is always in correct position at the correct location. This avoids errors during assembly so that assembly is thereby made simpler and more reliable.

According to an advantageous embodiment, the locking element for proper assembly can be reversibly expanded in diameter by the inner coupling section and/or by an actuating element. In this way, the inner coupling section can be inserted easily into the outer coupling section. Due to its elastic spring action, the locking element with its locking arc sections can snap into place in the locking section arranged at the inner coupling section and thereby lock the two coupling sections with each other. In this way, the coupling device is closed. In order to release the coupling device again, the locking element can be expanded again and the inner coupling section can be pulled out of the outer coupling section again. Since the locking element is reversibly expandable, it can equally perform its function upon the next insertion of an inner coupling section.

According to an advantageous embodiment, the actuating element can project through an opening in the outer one of the coupling sections. The actuating element can therefore have a greater length and thus a greater leverage so that upon expanding of the locking arc section more force, and distributed better, can be applied and the coupling device can be released more easily in this way. Also, the position of the locking element can be visually detected by means of the actuating element and it can thus be evaluated whether the locking element has indeed locked effectively in the locking section.

According to an advantageous embodiment, the actuating element can have a support region in circumferential direction. Support regions in circumferential direction, which upon closing of the locking element rest on the outer coupling section on which the locking element is arranged, can expediently effect an additional stabilization and stiffening of the actuating element for applying greater forces on the locking arc sections when opening the coupling device. Particularly advantageous is also an enlargement of the contact surface of the support region between the coupling sections so that greater forces can be transmitted.

According to an advantageous embodiment, the actuating element can be arranged adjacent to a free end of the locking arc section. In this way, when applying a force on the actuating element in order to expand the locking arc section and thereby release the coupling device, a greater leverage can be utilized so that the release process can be performed more easily. The locking arc section can thus be released more easily from the locking section with which it is locked.

According to an advantageous embodiment, the locking section can be embodied as an at least partially or completely circumferential, radial inwardly oriented shoulder against the pull-out direction of the coupling section, wherein the locking arc section in the properly mounted state is contacting the locking section and is supported against the pull-out direction. In this way, the locking arc section, when the inner coupling section is inserted into the outer coupling section, can glide in the expanded state across the rim of the locking section and then, when it has passed the shoulder, can snap into place and in this way lock the inner coupling section. In this way, a simple release of the coupling device by axially pulling the inner coupling section out of the outer coupling section is not possible; instead, the locking element must first be expanded again.

According to an advantageous embodiment, the locking element can be produced as one piece together with one of the coupling sections. In this way, a simple and cost-efficient manufacture of the outer coupling section with locking element of the coupling device, for example, by injection molding in a common tool, is possible.

According to an advantageous embodiment, the locking element can be produced with one of the coupling sections in an injection molding process. Alternatively, it is also possible to manufacture coupling section and locking element in an injection molding process with different materials. For example, the coupling section can be produced of a stronger material while the locking element exhibits a greater elasticity and bending stiffness.

According to an advantageous embodiment, the locking element can be produced in a two-component injection molding process together with one of the coupling sections but can be comprised of a different material than the coupling section. For example, the coupling section can be produced of a stronger material while the locking element exhibits a greater elasticity and bending stiffness.

According to an advantageous embodiment, in the coupling device the locking element can be embodied as a separate component and inserted into one of the coupling sections and preferably can be axially fixed by means of at least one connecting section, as well as secured at said one coupling section against release in particular by means of at least one snap element.

In this way, a coupling device can be realized which can be economically realized from standard synthetic materials, even without glass fiber reinforcement, and with greater free inner diameters, in particular greater than 40 mm. For this purpose, the coupling device may comprise a correlated pre-assembled resilient ring as locking element wherein the coupling device can transmit greater forces, in particular greater than 300 N. The locking element can cover a large angle range for receiving the other one of the two coupling sections. In this way, in particular angle ranges within a range of magnitude of 300 degrees can be realized so that a fixed connection between the two coupling sections can be achieved.

This can be achieved inter alia in that at support regions of the locking element, embodied as spring arms, ribs are attached as support elements with corresponding large contact surfaces for force transmission which dip into corresponding support grooves at the coupling section. Such a solution is advantageous compared to the known solutions where forces are transmitted only through slot-shaped circumferential openings in the coupling section. In addition, it can be beneficial to provide in this region a form-fit connection, for example, as snap hook, or of material-fused connection, for example, as weld connection between locking element and coupling section.

According to the invention, the outwardly engaging spring arms at the locking element are designed to be appropriately wide as support regions in order to relieve the slot-shaped circumferential opening, which must have an appropriate size for mounting of the locking element, in regard to transmitting forces. Moreover, the spring arms at the end face positioned opposite to the circumferential opening are provided with ribs as support elements which serve for force transmission into the coupling section. These ribs in the coupling section engage corresponding partially or completely closed support grooves in the form of pockets so that substantially greater forces can be transmitted than with the circumferential opening. In this way, it is also possible to economically realize higher technical demands on a coupling device by means of a resilient ring of synthetic material as locking element.

Advantageously, the coupling section can be integrated into a corresponding housing, for example, of an air filter. The coupling section of a hose-shaped or tubular section or of a socket to be connected therewith, which, as needed, is provided with a sealing element, can also be embodied of synthetic material. As an example, a clean air conduit may be mentioned.

In this way, advantageously, a quick coupling device of synthetic material can be provided that is releasable without a tool. The locking element can be produced separately and, by insertion into one of the coupling sections, can be connected therewith in a releasable way. Alternatively, the locking element can also be non-releasably connected to the coupling section, for example, by means of a non-releasable locking action or by gluing or welding.

According to an advantageous embodiment, the locking element can comprise at least one support element which extends in circumferential direction. In this context, the at least one support element in the mounted state can interact by form fit or friction fit with a corresponding support groove that extends at least partially circumferentially on the circumference of the coupling section for axial securing of the coupling device. The at least one support element can absorb additionally forces in axial pull-out direction of the coupling device by dipping into the support groove of the coupling section and ensure a stable connection between the two coupling sections in this way. For reasons of symmetrical force distribution, it is particularly advantageous when, at a circumferential region of the locking element, two support elements are provided that are positioned opposite each other.

According to an advantageous embodiment, at least one support region can be embodied as spring element extending in circumferential direction and, when properly mounted, can be supported on an outer circumference of one of the coupling sections. In this way, a closing force of the coupling device can be reliably achieved. In this way, the support region provides for a reliable connection between the two coupling sections because the support region holds by its spring action the locking element in closed position in the normal state. When the coupling device is to be released, the locking element by means of the two actuating elements can be reversibly spread apart and the connection can be released in this way. In this context, for spreading apart the locking element, the closing force of the spring element, which is supported at the circumference of the first coupling section, must be overcome.

According to an advantageous embodiment, the other one of the coupling sections can comprise a guide element which interacts with a counterpart guide element of the first coupling section and is positionable diametrically opposed to the free ends of the locking arc sections. In this context, the guide element can secure the other one of the coupling sections in the mounted state against tilting about a longitudinal axis. In this way, it can be reliably prevented that the two coupling sections are tilted relative to each other, as would be possible, for example, under vibration, and accidentally released from each other in this way. The guide element expediently can be embodied for this purpose as a tube section-like extension of the coupling section across a certain angle range, for example, about 180 degrees, that projects into the other coupling section. The counterpart guide element can be embodied, complementary thereto, as a tube section-like counterpart member, for example, as a cutout. In this way, guide element and counterpart guide element upon joining the two coupling sections can engage each other suitably so that also a preferred direction of the two coupling sections for mounting can be realized by means of which the coupling sections can be mounted correctly positioned in an angular position relative to the longitudinal axis.

According to an advantageous embodiment, at least two orientation elements can be provided by means of which the coupling sections can be mounted correctly positioned in an angular position relative to the longitudinal axis. The two coupling sections can be mounted with orientation in this way. The orientation elements can be embodied, for example, as nose on a coupling section and as an associated slit at the other coupling section. The orientation elements can advantageously also serve as an anti-rotation device.

According to an advantageous embodiment, at least one coupling section can have at least one marking for recognizing a locking action of the locking element in the locking section by means of a position of the at least one actuating element. The position of the actuating elements enables recognition of the state of the locking action of the locking element in the locking section. Therefore, it is possible in a simple way to evaluate, for example, by means of the markings which correlate with the position of the actuating elements, the state of the coupling device. In this way, a reliable conclusion in regard to the state of the locking action is possible without having to load the coupling device by a pulling action.

According to an advantageous embodiment, on at least one of the coupling sections a sealing groove can be provided which, on the circumference of the corresponding coupling section, is at least partially embodied in a corrugated shape in the assembly direction. This makes it possible, when the seal is inserted, in particular in assembly direction, and brought into a corresponding corrugated shape due to the receiving geometry of the sealing groove, to provide an advantageous reduction of the assembly force for producing the connection between the coupling sections.

According to a further aspect of the invention, the use of the coupling device is proposed for producing a quasi-rigid connection of media-conducting lines, in particular low-pressure and/or high-pressure lines in an air intake system, or media-conducting housings with connecting sockets and lines. For assembly, an axis-precise installation is not required. The coupling device can easily compensate movements produced during installation or by slight positional changes between connecting points. Also, in a simple way a safe and reliable connection between two coupling sections can be thus produced which can be released in likewise simple manner without tools.

According to a further aspect of the invention, a coupling section for a coupling device is proposed with a locking element that comprises at least one locking arc section which is matched at least partially to the circumference of the coupling section and, in mounted state, is interacting as intended with a corresponding locking section extending circumferentially at least partially about the circumference of another coupling section such that, in the mounted state of the coupling sections, an axial movement between the coupling sections can be limited. The coupling section can be part of a duct which is to be connected by means of the coupling device with another duct.

Advantageously, handling can be simplified by at least one actuating element which is provided on the locking element for opening the locking arc sections.

According to an advantageous configuration, the locking element can be reversibly expandable in diameter for proper mounting. Since the locking element is reversibly expandable, it can equally perform its function for the next insertion of an inner coupling section. The coupling section with locking element can thus be reused several times.

According to a further aspect of the invention, a coupling section for a coupling device is proposed with a locking section that extends circumferentially at least partially about the circumference of the coupling section and is properly interacting in the mounted state with a corresponding locking arc section of a locking element that is at least partially matched to the circumference of another coupling section in such a way that an axial movement between the coupling sections can be limited. The coupling section can be part of a duct which is to be connected by means of the coupling device with another duct. Also, in a simple way a safe and reliable connection between two coupling sections can be produced which can be released again in a likewise simple way without tools.

According to an advantageous configuration, the locking section can be embodied as a circumferential, radial inwardly oriented shoulder against the pull-out direction of the coupling section wherein the locking arc section for proper mounting is resting on the locking section and is supported against the pull-out direction. In this way, a simple release of the coupling device by axially pulling the inner coupling section out of the outer coupling section is not possible. Instead, for releasing the coupling device, the locking element must first be expanded again. Only thereafter, the inner coupling section can be pulled out of the outer coupling section.

According to a further aspect of the invention, a locking element for a coupling device is proposed that comprises at least one locking arc section that is matched at least partially to the circumference of the coupling section. The locking arc section interacts as intended in the mounted state with at least one corresponding locking section, circumferentially extending at least partially about the circumference of another coupling section, in such a way that in the mounted state of the coupling sections an axial movement between the coupling sections can be limited. It is furthermore proposed that the locking element comprises at least one connecting section for attachment to one of the coupling sections as well as in particular at least one snap element for securing against release from said one coupling section. In this way, a quick coupling device of synthetic material that is releasable without a tool can be advantageously realized. The locking element can be separately produced and, by insertion into said one coupling section, can be releasably connected thereto. Alternatively, the locking element can also be connected in a non-releasable way to the coupling section, for example, by means of a non-releasable locking action or by gluing or welding.

According to the invention, a coupling device can thus be realized which can be realized economically from standard synthetic materials, even without glass fiber reinforcement, and with greater free inner diameters, in particular greater than 40 mm. For this purpose, the coupling device can comprise a correlated preassembled resilient ring as a locking element wherein the coupling device can transmit greater forces, in particular greater than 300 N. The locking element can cover a large angle range for receiving the other one of the two coupling sections. In particular, angular ranges of a magnitude range of 300 degrees can be realized so that a fixed connection between the two coupling sections is achievable.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to other meaningful combinations.

DESCRIPTION OF PREFERRED EMBODIMENTS

Figure 1:
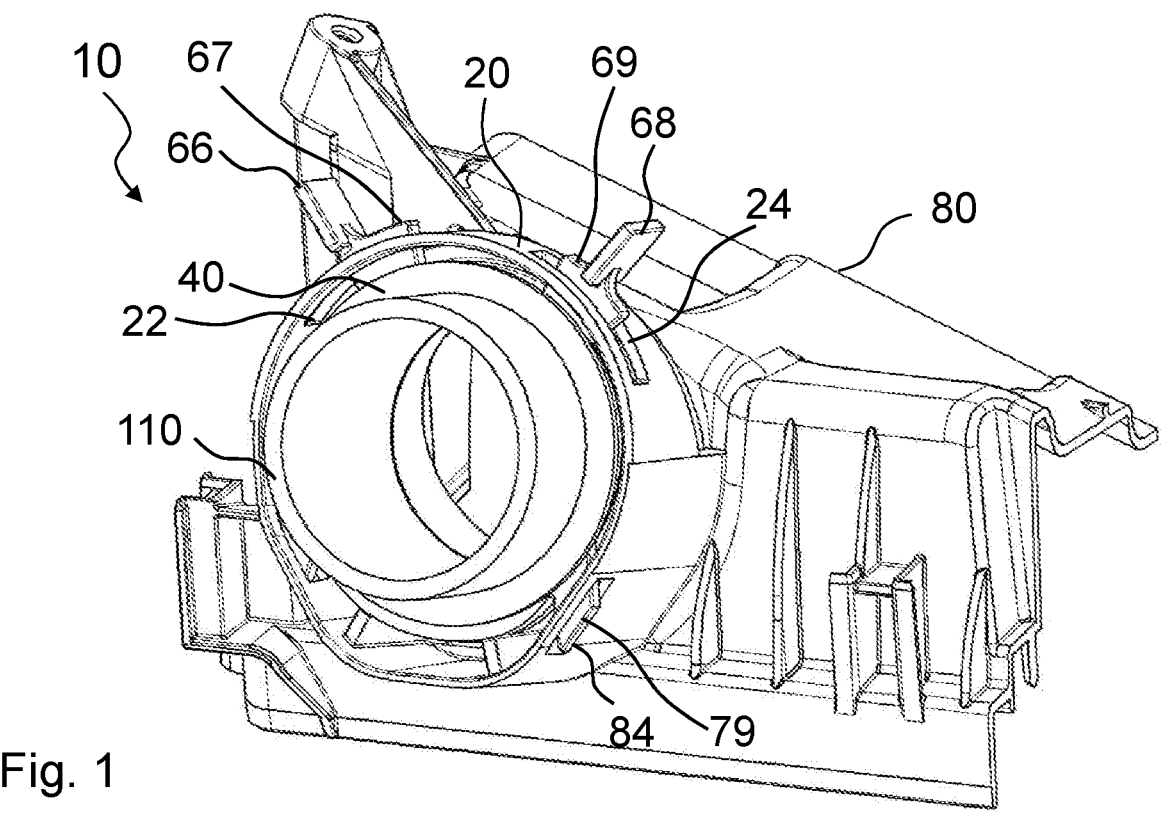
FIG. 1 is an isometric view of a coupling device according to an embodiment of the invention.

In the Figures, same or same-type components are identified with same reference characters. The Figures show only examples and are not to be understood as limiting.

Figure 2:
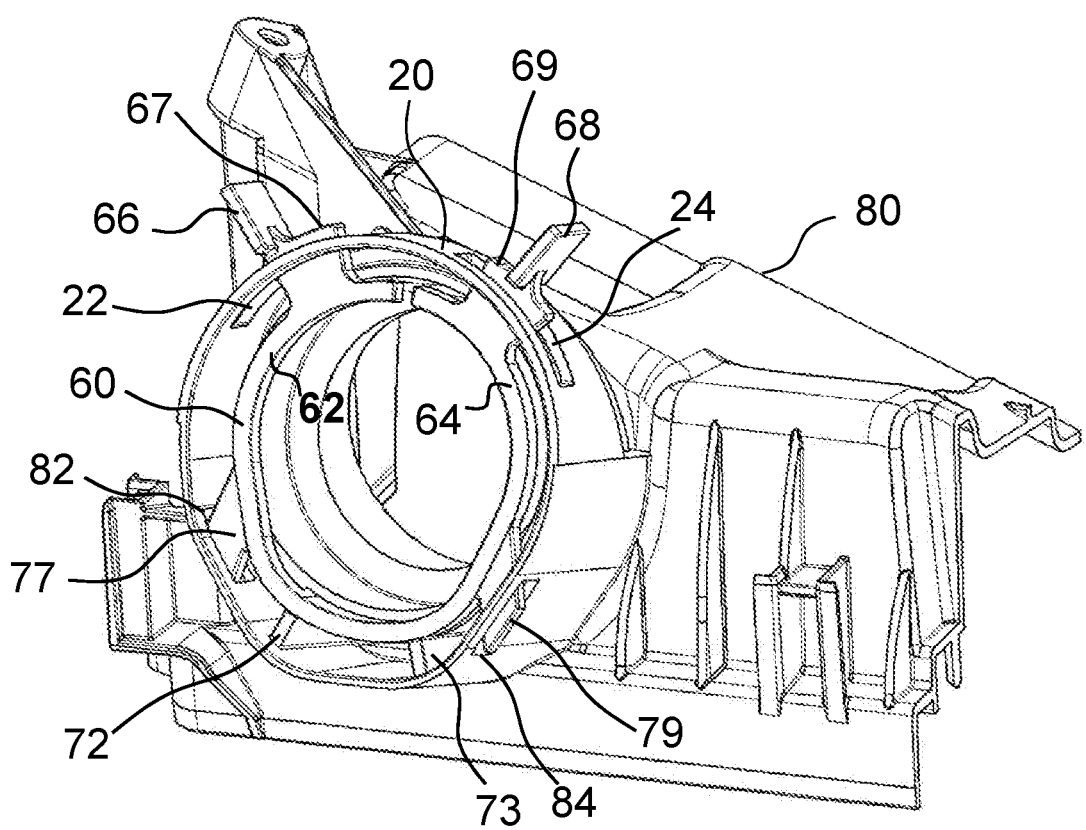
FIG. 2 is an isometric view of the outer coupling section of the coupling device according to FIG. 1.
Figure 3:
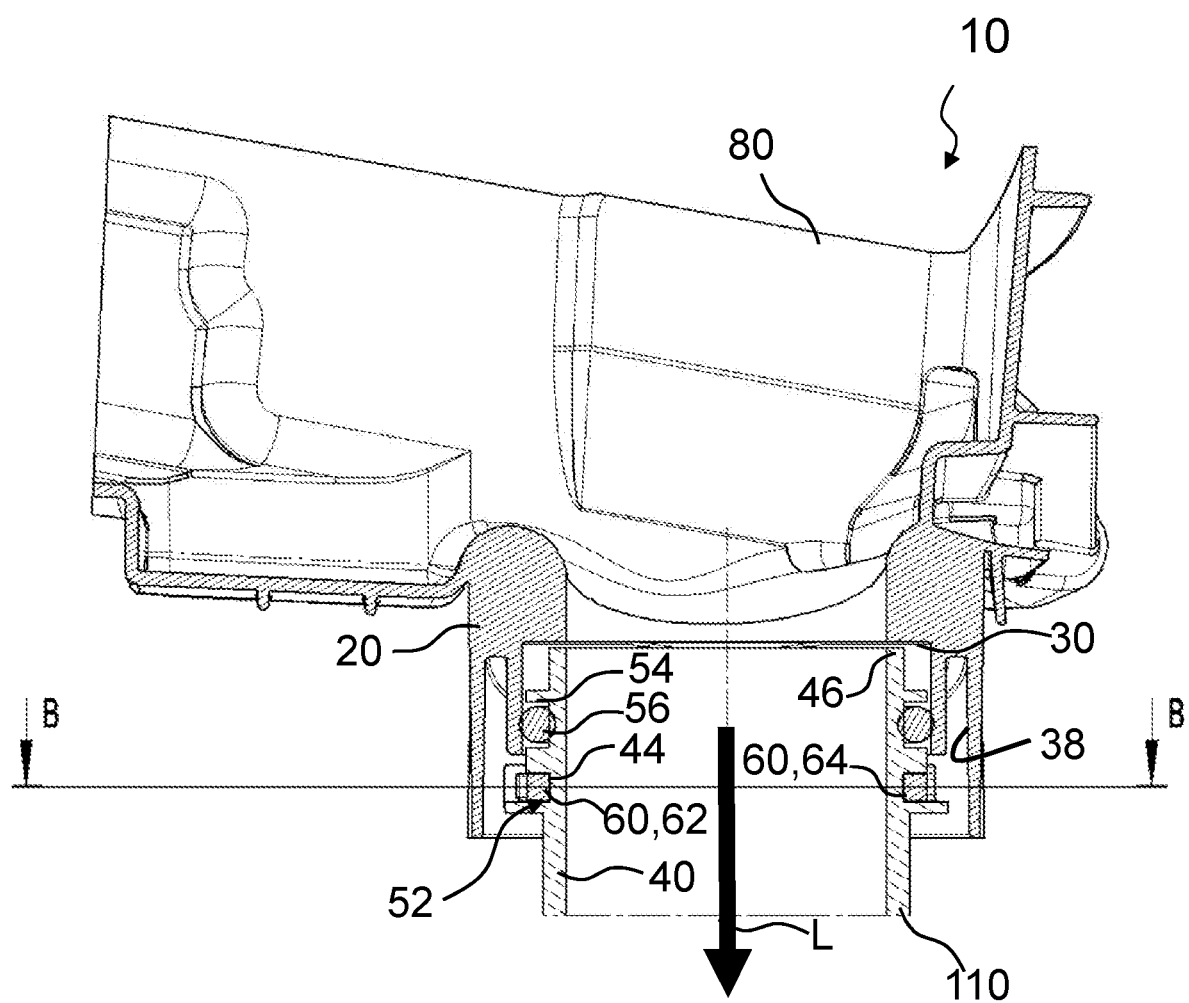
FIG. 3 shows a longitudinal section of the coupling device according to FIG. 1 in closed position.

FIG. 1 shows an isometric view of a coupling device 10 according to an embodiment of the invention while in FIG. 2 an isometric view of the outer coupling section 20 is illustrated. The coupling device 10 is arranged on the housing 80 of an air filter system that is illustrated partially. In FIG. 3, a corresponding longitudinal section of the coupling device 10 and in FIG. 4 a cross section of the coupling device 10 along the section line B-B according to FIG. 3 are illustrated.

The coupling device 10 which serves for quasi rigid connection of media-conducting lines, for example, of especially low-pressure and/or high-pressure associated lines 110 of an air intake system or media-conducting housings with connecting sockets and lines, comprises an outer coupling section 20 and an inner coupling section 40 as well as, for example, a locking element 60.

The outer coupling section 20 in FIG. 1 is illustrated as a component of a housing 80 that can be, for example, the housing of an air filter system. The outer coupling section 20 is illustrated in the form of a connecting socket. The inner coupling section 40 can be, for example, arranged at the end of an air-conducting pipe 110. The coupling device 10 can however be used also on other components which provide for a connection of fluid-conducting pipes.

The inner coupling section 40 is inserted with its free end into the outer coupling section 20 so that the coupling device 10 with the locking element 60 is illustrated in the closed state. The actuating elements 66, 68 for opening the locking element 60 project through the openings 22, 24 in the outer coupling section 20 in outward direction so that they are easily accessible and can be actuated without tool.

In FIG. 2, the two locking arc sections 62, 64 of the locking element 60 arranged on the outer coupling section 20 can be seen which extend in circumferential direction in the interior of the outer coupling section 20. The locking element 60 is connected by two connecting sections 72, 73 with the outer coupling section 20. The locking arc sections 62, 64 can be radially pivoted in outward direction by the actuating elements 66, 68 which project outwardly through openings 22, 24 through the outer coupling section 20. On their circumference, the locking arc sections 62, 64 comprise for reinforcement support regions 67, 69, 77, 79, in particular in the region of the actuating elements 66, 68, wherein the support regions 67, 69, 77, 79 also project through openings of the outer coupling section 20 outwardly in order to ensure the required freedom of movement upon pivoting of the locking arc sections 62, 64.

Figure 13:
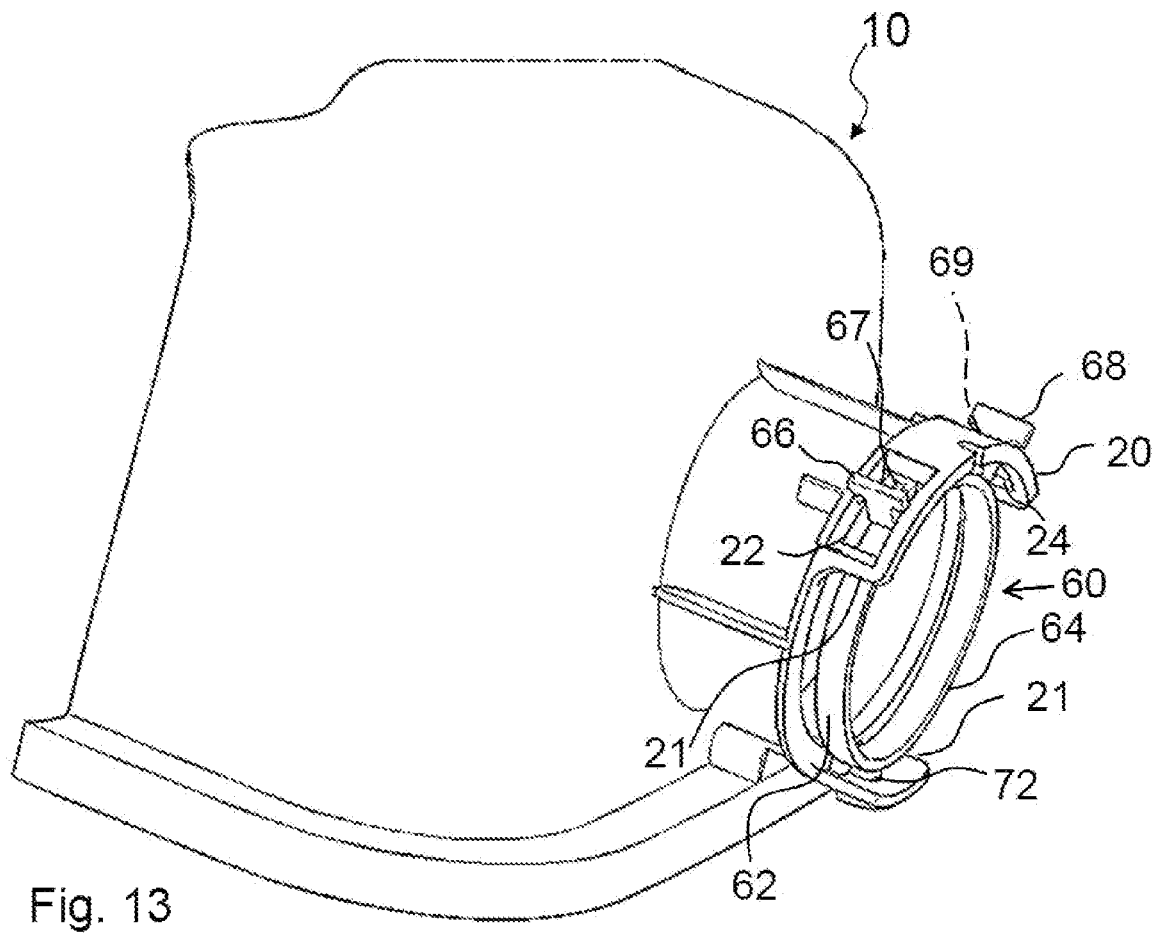
FIG. 13 is an isometric view of a coupling section of a coupling device according to an embodiment of the invention.

In FIG. 3, it can be seen in longitudinal section of the closed coupling device 10 how the inner coupling section 40 is inserted into the outer coupling section 20 and the two locking arc sections 62, 64 of the locking element 60 arranged on the outer coupling section 20 can lock on the corresponding circumferentially extending locking section 52 of the inner coupling section 40 when the inner coupling section 40 is inserted so far into the outer coupling section 20 that a circumferentially extending stop 46 is resting against the open end 30 of a circumferential groove 38 of the outer coupling section 20. The illustrated circumferential groove 38 is advantageous because it covers completely the locking element 60 in outward direction and protects it in this way. Optionally, instead of the circumferential groove 38, it can however be provided to ensure only a sufficiently stable connection to the coupling region of the coupling section in the area of the connecting sections and the support regions. This is illustrated in FIG. 13.

The locking section 52 is embodied as a circumferential, radial inwardly oriented shoulder 44, in the illustrated embodiment in the form of a groove, against the pull-out direction L of the coupling section 40 wherein the locking arc section 62, 64 in the properly mounted state is contacting the locking section 52 and is supported against the pull-out direction L. In this way, the inner coupling section 40 is secured against being pulled out of the outer coupling section 20 in pull-out direction L.

The coupling device 10 is sealed by means of a seal 56 inserted into a sealing groove 54, for example, an O-ring seal, which is contacting an inner wall of the outer coupling section 20.

Figure 4:
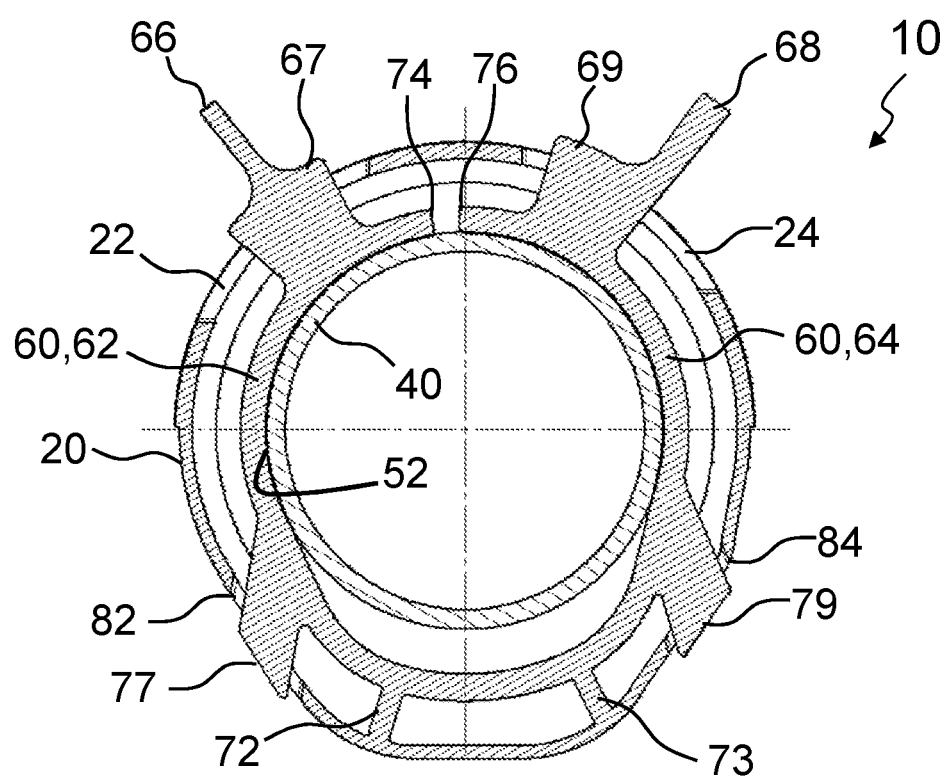
FIG. 4 is a cross section of the coupling device according to FIG. 1 in closed position along the section line B-B in FIG. 3.

In the cross section illustrated in FIG. 4 of the coupling device 10 along the section line B-B according to FIG. 3, the embodiment of the locking element 60 can be seen in detail. The locking element 60 is fastened with two connecting sections 72, 73 to the outer coupling section 20 and extends in circumferential direction on both sides of the connecting sections 72, 73 with one locking arc section 62, 64 each between the two coupling sections 40, 20. The locking element 60 comprises locking arc section 62, 64 which are at least partially matched to the circumference of the coupling section 20. For proper mounting by insertion of the inner coupling section 40 into the outer coupling section 20, the locking element 60 is reversibly expandable in diameter by the inner coupling section 40 and interacts with the circumferentially extending locking section 52 in such a way that in the mounted state of the coupling sections 20, 40 an axial movement between the coupling sections 20, 40 is limited. For this purpose, the locking arc sections 62, 64 are contacting the circumferential shoulder 44 of the locking section 52.

Since the inner coupling section 40 is contacting with the stop 46 the free end 30 of the outer coupling section 20, the inner coupling section 40 is fixed by the locking arc sections 62, 64 contacting the shoulder 44 in the pull-out direction L. For opening the locking arc sections 62, 64, on the locking element 60 the actuating elements 66, 68 are provided which are arranged neighboring the free ends 74, 76 of the locking arc sections 62, 64. In addition, the actuating elements 66, 68 each have a support region 67, 69, 77, 79 in circumferential direction which stiffens the actuating element 66, 68 for applying greater forces onto the locking arc section 62, 64 and in particular provides a greater contact surface of the support region. Actuating elements 66, 68 and support regions 67, 69 project through the openings 22, 24 and the support regions 77, 79 through the openings 82, 84 in the outer rim of the outer coupling section 20 to the exterior so that the locking element 60 can be expanded by pushing apart the actuating levers 66, 68 in circumferential direction and thus the locking arc sections 62, 64. The locking arc sections 62, 64 are thus lifted off the shoulder 44 of the locking section 52 so that the inner coupling section 40 can be pulled out of the outer coupling section 20.

The locking element 60 is integrally formed with the connecting sections 72, 73 on the coupling section 20 and is produced as one piece together with it so that the coupling device 10 as a whole can be produced inexpensively. Alternatively, the locking element 60 can also be produced together with the coupling section 20 in an injection molding process, for example, in a two-component injection molding process. In this way, coupling section 20 and locking element 60 can be produced of different materials when, for example, the coupling section 20 is to have greater strength than the elastic and at the same time bending resistant locking element 60 that, for opening of the coupling device 10, is to be reversibly expandable.

Figure 5:
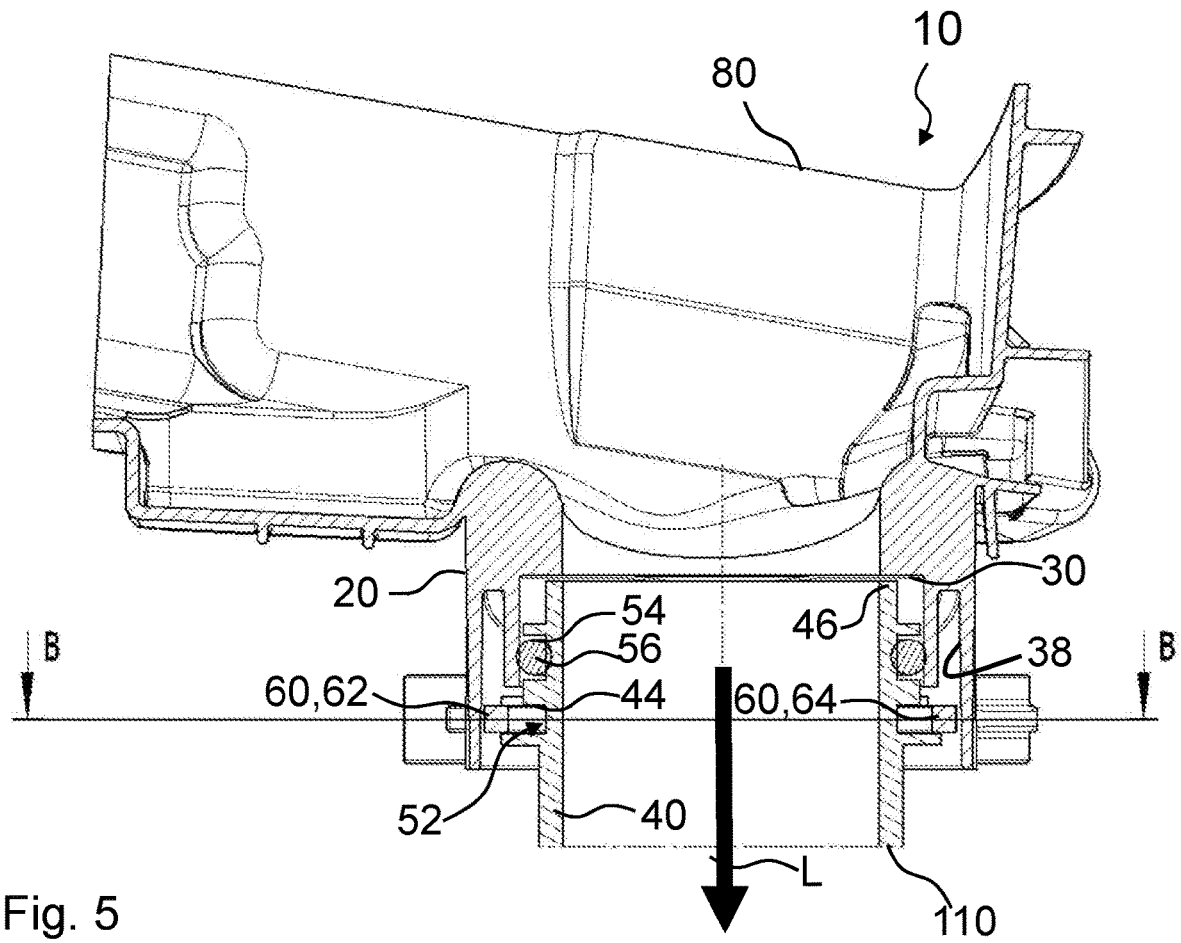
FIG. 5 shows a longitudinal section of the coupling device according to FIG. 1 in open position.
Figure 6:
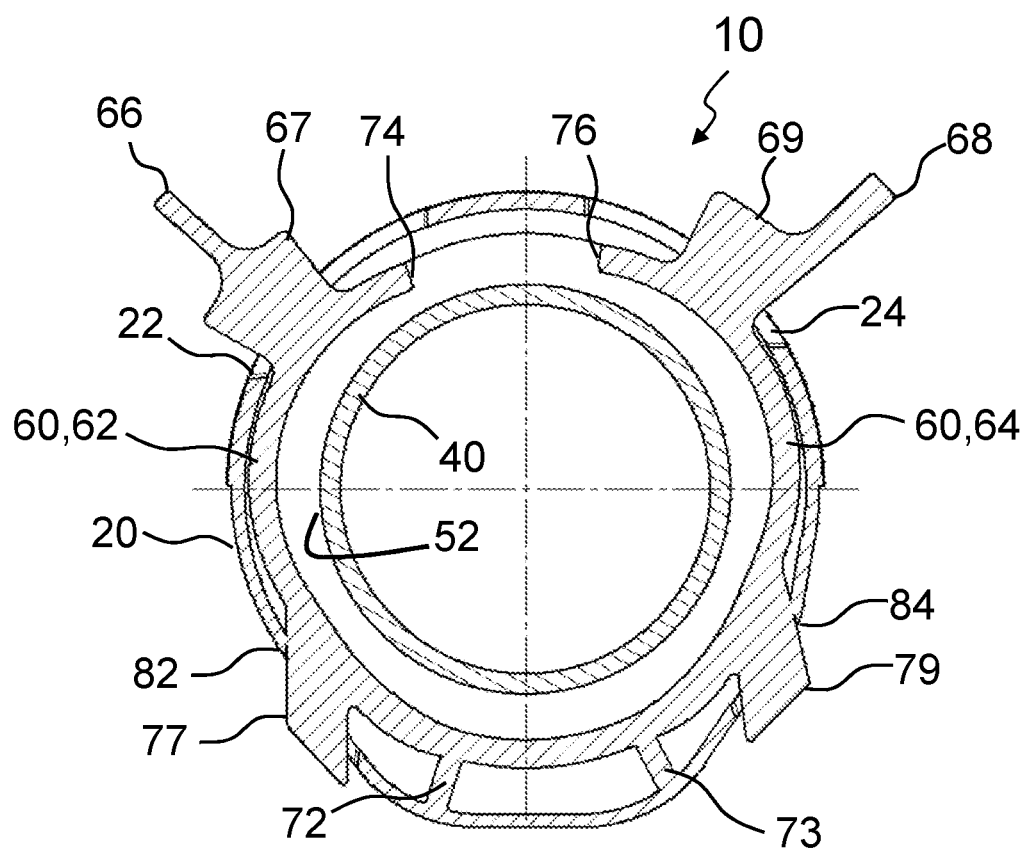
FIG. 6 is a cross-section of the coupling device according to FIG. 1 in open position along the section line B-B in FIG. 5.

In FIGS. 5 and 6, the coupling device 10 is illustrated in open position in longitudinal section and cross section, respectively. In this position, the two locking arc sections 62, 64 can be released from each other. The two locking arc sections 62, 64 are pivoted outwardly in this context so that they lift off the shoulder 44 of the locking section 52. In this way, the inner coupling section 40 in pull-out direction L is no longer fixed and can thus be pulled out of the outer coupling section 20. In the illustrated embodiment, the locking arc sections 62, 64 in open position can be resting on an inner wall of the outer coupling section 20. Also, a lateral contact of the actuating elements 66, 68 on the coupling section 20 can be realized before a locking arc section 62, 64 contacts the inner wall. It is also possible that no inner wall is provided, as in the embodiment according to FIG. 13.

Figure 7:
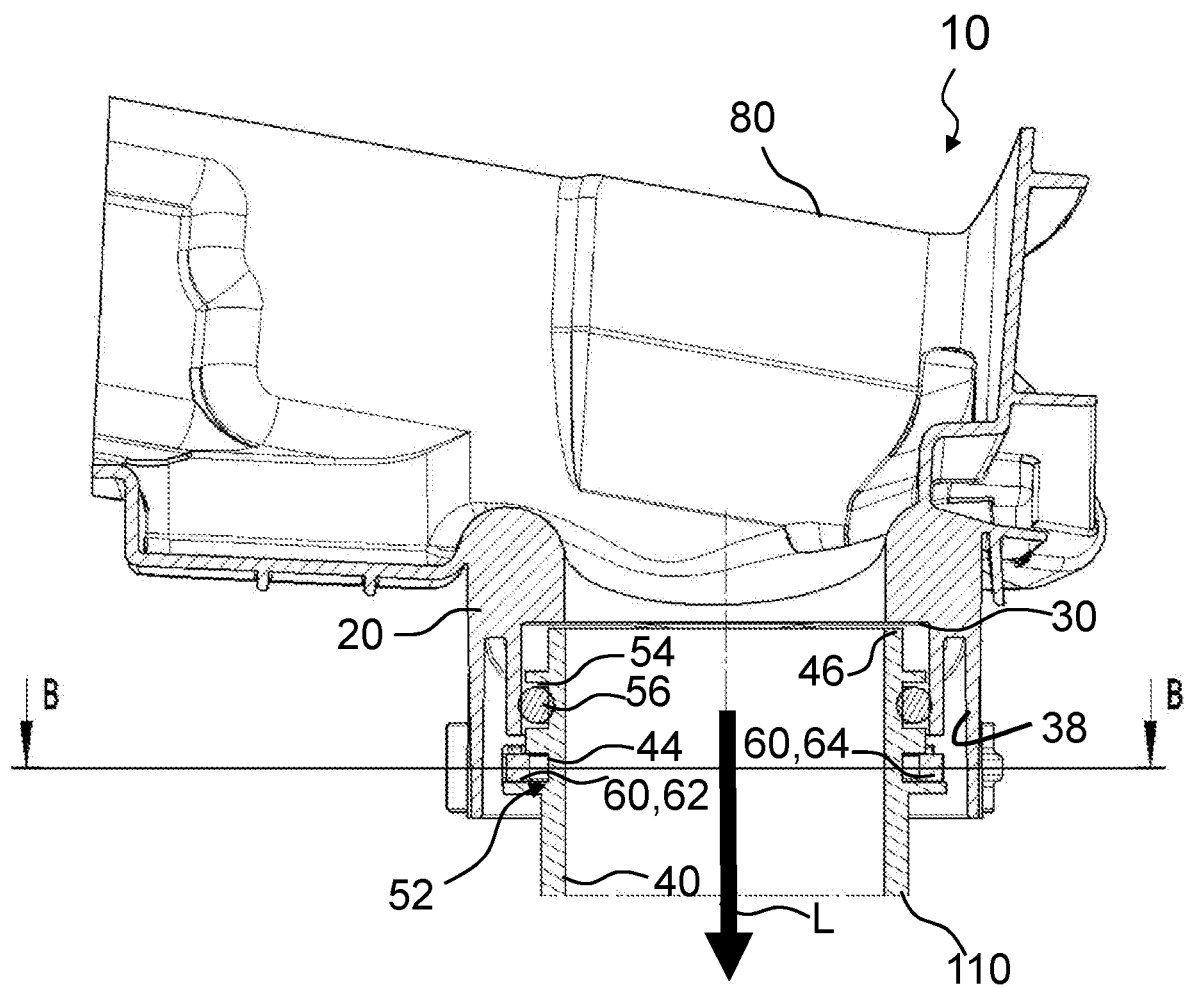
FIG. 7 shows a longitudinal section of the coupling device according to FIG. 1 in half open position.
Figure 8:
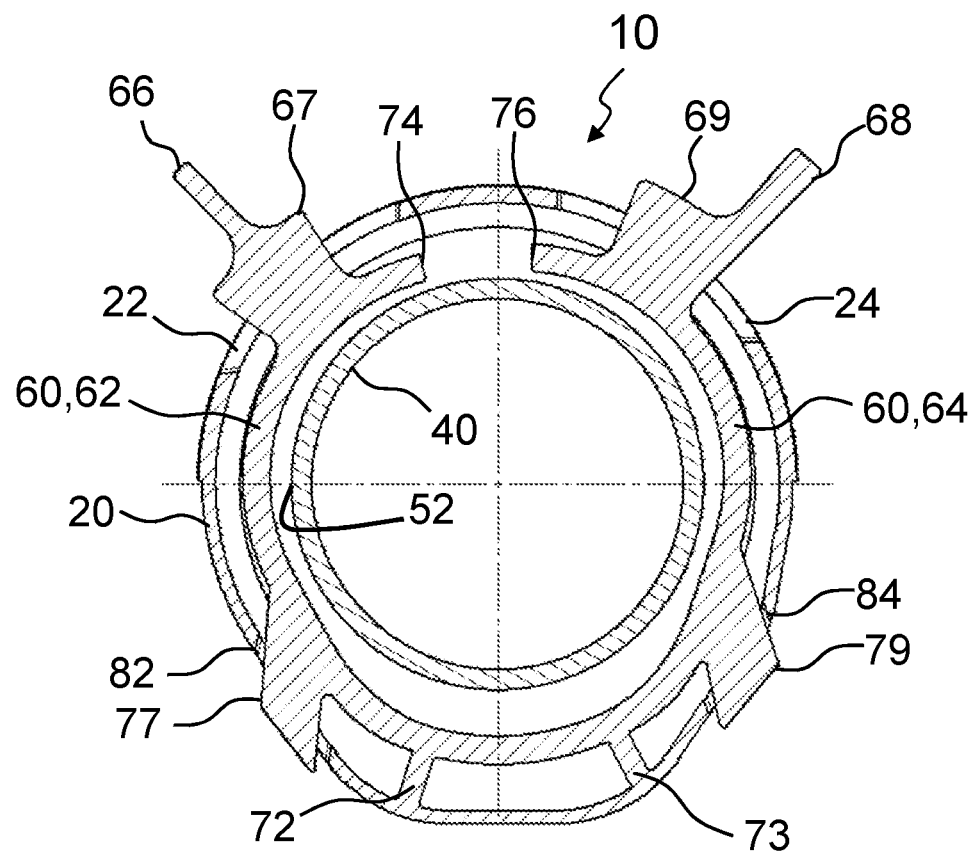
FIG. 8 shows a cross section of the coupling device according to FIG. 1 in half open position along the section line B-B in FIG. 7.

In FIGS. 7 and 8, the coupling device 10 is illustrated in half open position in longitudinal section and cross section, respectively. Here, the two locking arc sections 62, 64, pivoted outwardly, are shown in a position that is between the closed and the open position.

Figure 9:
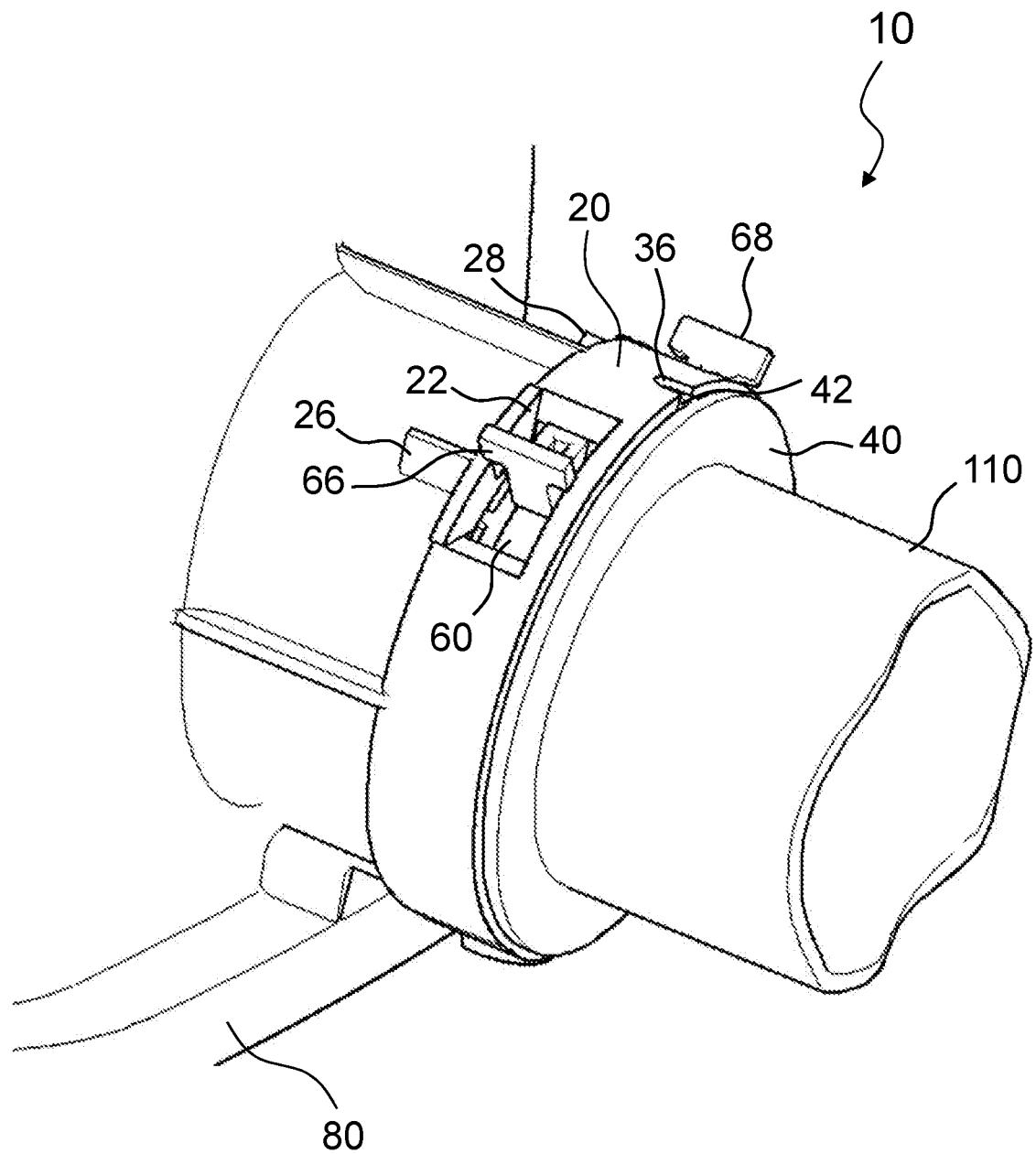
FIG. 9 is an isometric view of a coupling device according to a further embodiment of the invention.
Figure 10:
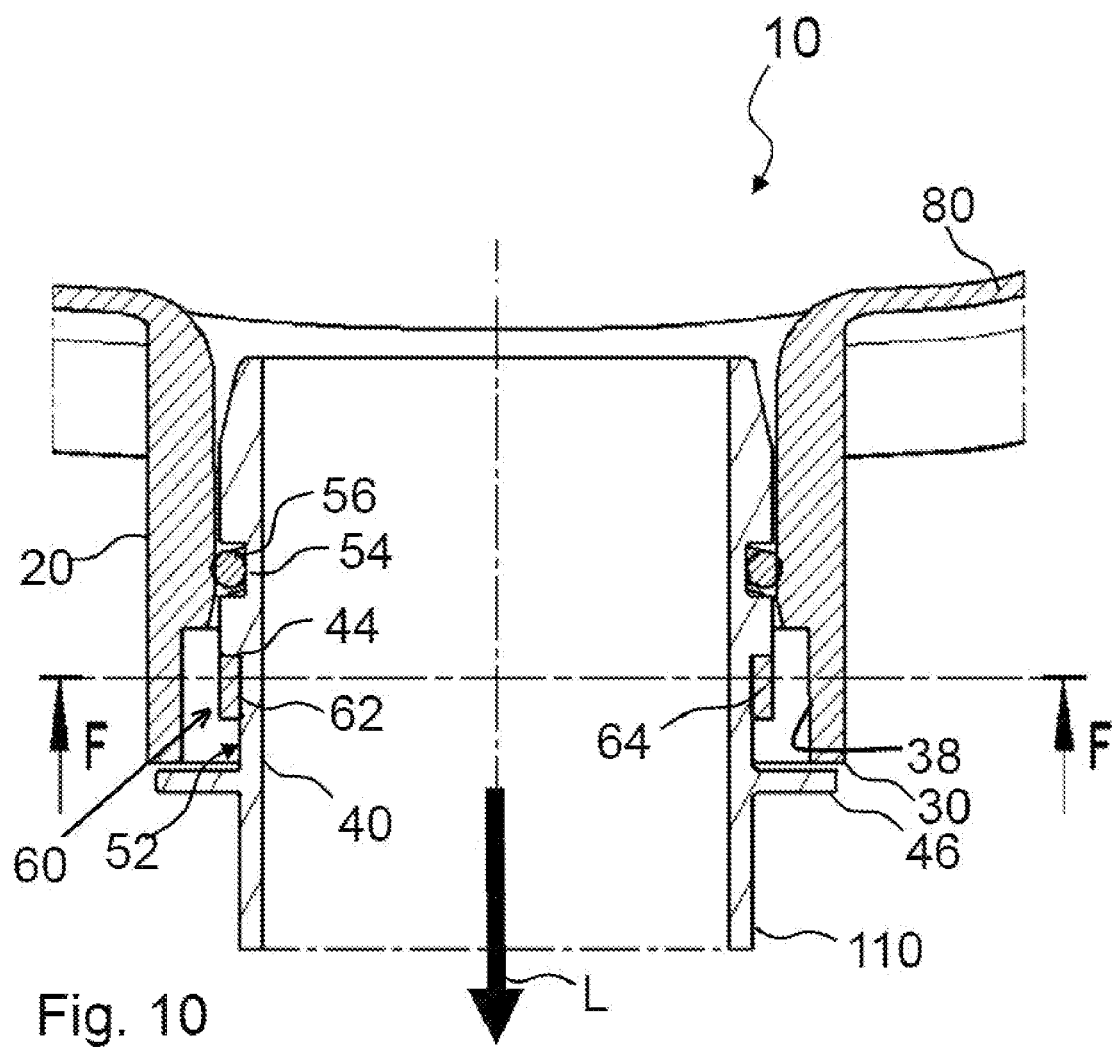
FIG. 10 shows a longitudinal section of the coupling device according to FIG. 9 in closed position.
Figure 11:
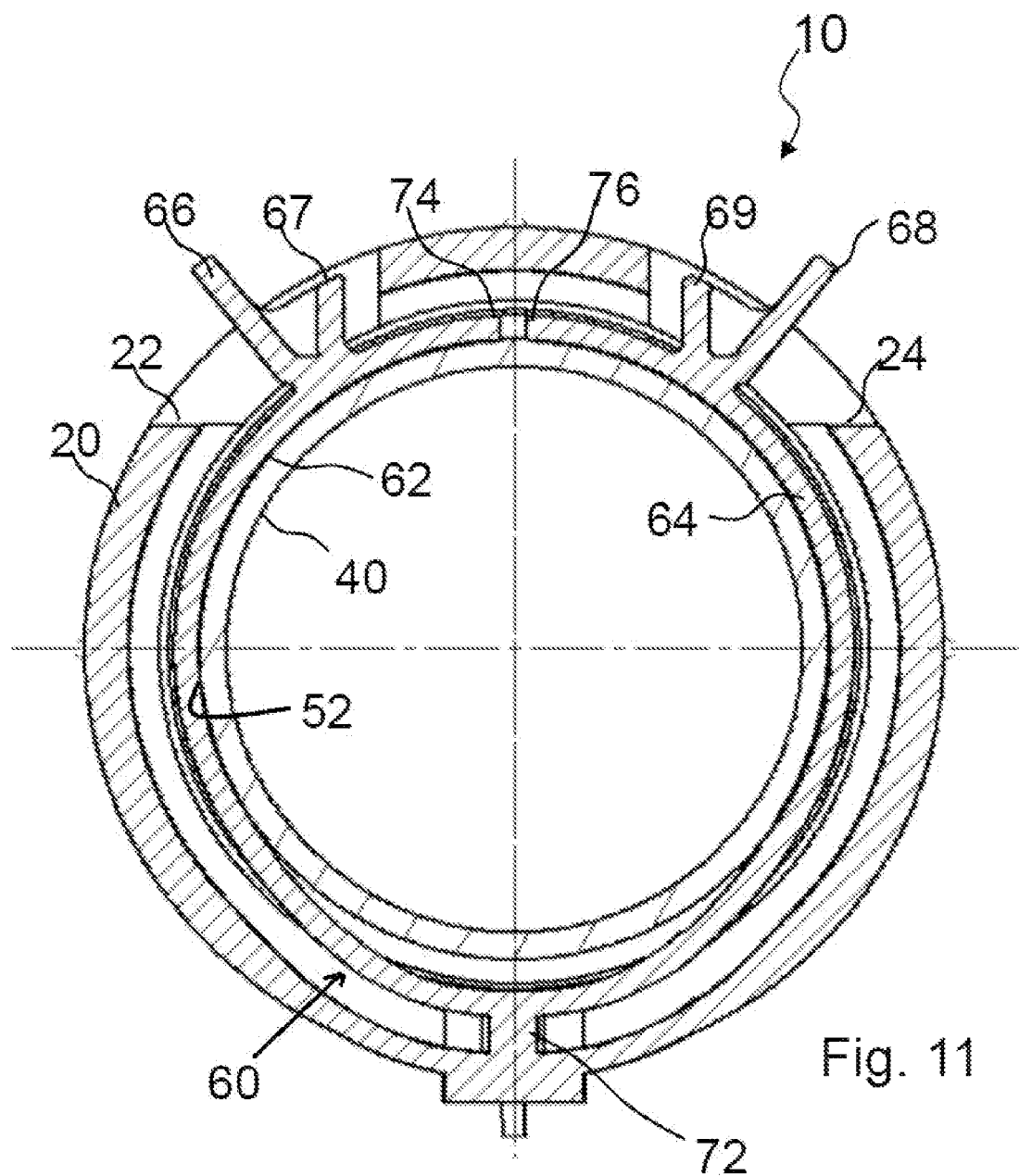
FIG. 11 shows a cross section of the coupling device according to FIG. 9 in closed position along the section line F-F of FIG. 10.

FIGS. 9 through 11 show a further embodiment of the coupling device 10. FIG. 9 shows in isometric illustration a coupling device 10 which is arranged on a housing 80 wherein an outer coupling section 20 is fixedly connected with the housing 80, for example, is embodied as one piece together with the housing 80. An inner coupling section 40 is inserted into the outer coupling section 20 and is locked by means of a locking element 60.

The coupling device 10 comprises marking devices 26, 28 for recognizing a position of the coupling device 10. In the locked, i.e., closed, state of the coupling device 10, the position of the actuating elements 66, 68 coincides with the markings 26, 28 provided on the outer coupling part 20 so that locking of the locking element 60 can be recognized from the exterior. Moreover, on the two coupling sections 20, 40 two orientation elements 36, 42 are provided by means of which the coupling sections 20, 40 can be mounted, correctly positioned, in an angular position relative to the longitudinal axis. One of the orientation elements 36 can be provided, for example, as a slit on the circumference of the outer coupling section 20 while the other orientation element 42 can be a nose on the circumference of the inner coupling section 40 which, upon insertion of the two coupling sections 20, 40, fit into each other and determine in this way an angular position relative to the longitudinal axis of the two coupling sections 20, 40 about the longitudinal axis upon insertion.

FIG. 10 shows a longitudinal section of the coupling device 10 according to FIG. 9. The locking section 52 of this embodiment is embodied wider in axial direction. The locking arc sections 62, 64 in the pull-out direction L are contacting only the shoulder 44 while the fixation of the inner coupling section 40 in opposite direction is realized by contact of the outwardly positioned stop 46 on the free end 30 of the outer coupling section 20.

FIG. 11 shows a cross section of the coupling device 10 according to FIG. 9 in closed position along the section line F-F in FIG. 10. As can be seen in cross section, a further difference of the coupling device 10 illustrated in FIGS. 9 through 11 resides in that the locking element 60 is connected by only one connecting section 72 with the outer coupling section 20. Also, the locking arc sections 62, 64 each have only one support region 67, 69 which is connected with the actuating elements 66, 68 and pivots outwardly through the openings 22, 24 upon pivoting of the locking arc sections 62, 64 in outward direction. The locking element 60 can exhibit greater elasticity because it is connected only by one connecting section 72 with the outer coupling section 20 so that it can be opened more easily and the inner coupling section 40 can thus be pulled out of the outer coupling section 20.

Figure 12:
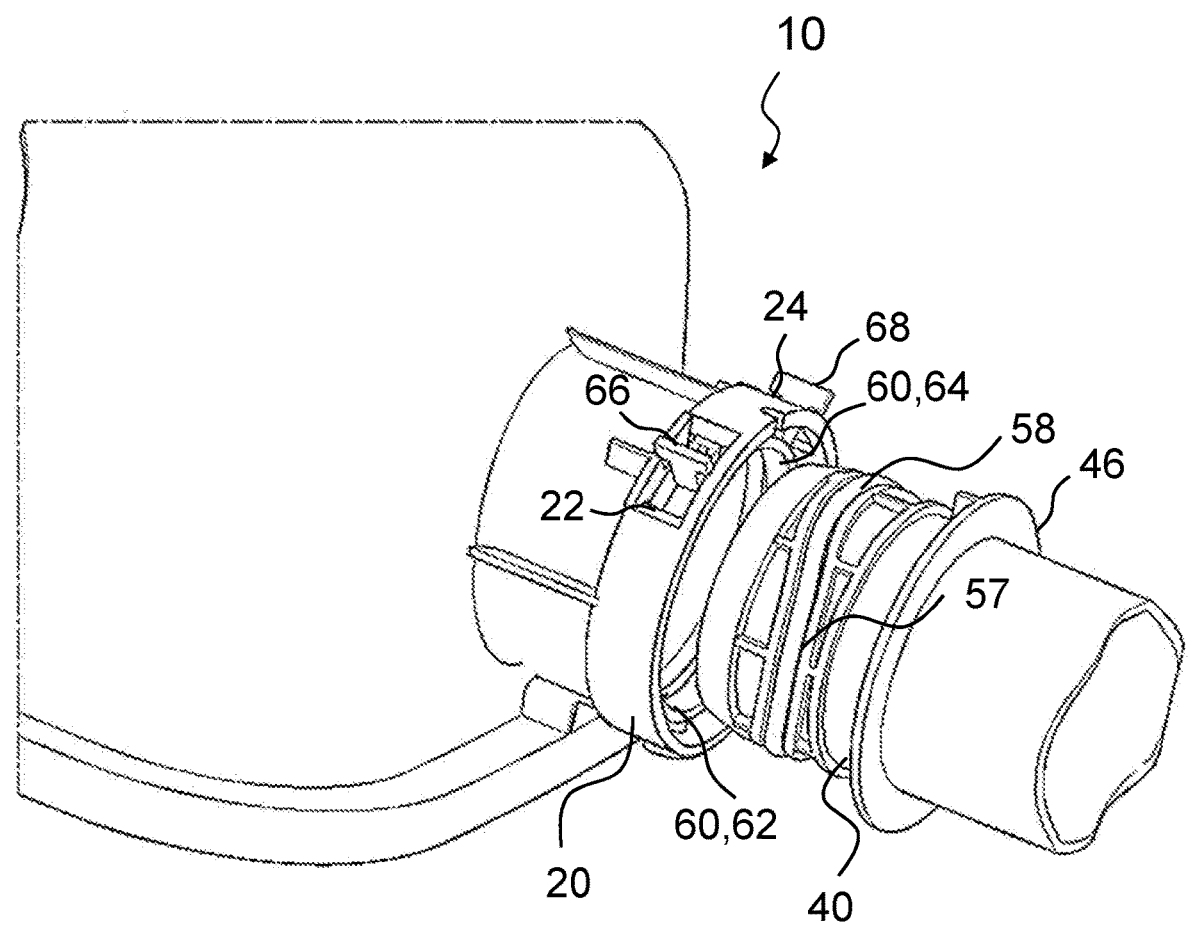
FIG. 12 is an isometric view of a coupling device according to an embodiment of the invention with a sealing groove extending on the circumference at least partially in a corrugated shape in the assembly direction.

FIG. 12 shows in isometric illustration a coupling device 10 with not yet connected coupling sections 20, 40 which, when the connection between the coupling sections 20, 40 is produced, corresponds from the exterior to that of FIG. 10. Instead of a simple round ring as seal 56, as in FIG. 3, on the inner coupling section 40 a corrugated groove 57 is provided with a seal 58 that, corresponding to the receiving geometry, has been brought into a corrugated shape. Since the sealing groove 57 for the seal 58 about the circumference of the coupling section 40 exhibits a corrugated shape at least partially in assembly direction, in particular in assembly direction, the mounting force to be applied for closing the coupling device can be advantageously reduced.

FIG. 13 shows a variant of the outer coupling section 20 in FIG. 3. Instead of a circumferential groove 38 as in FIG. 3, in this embodiment it is provided, for example, that only in the area of the connecting section 72 of the locking element 60 and in the area of the respective support regions 67, 69 which are arranged adjacent to the actuating elements 66, 68 at the free ends of the locking arc sections 62, 64, a stable connection to the outer wall of the coupling section 20 is provided. The outer wall of the outer coupling section 20 is provided with two cutouts 21 between the support regions 67, 69 and the connecting section 72, respectively.

Figure 14:
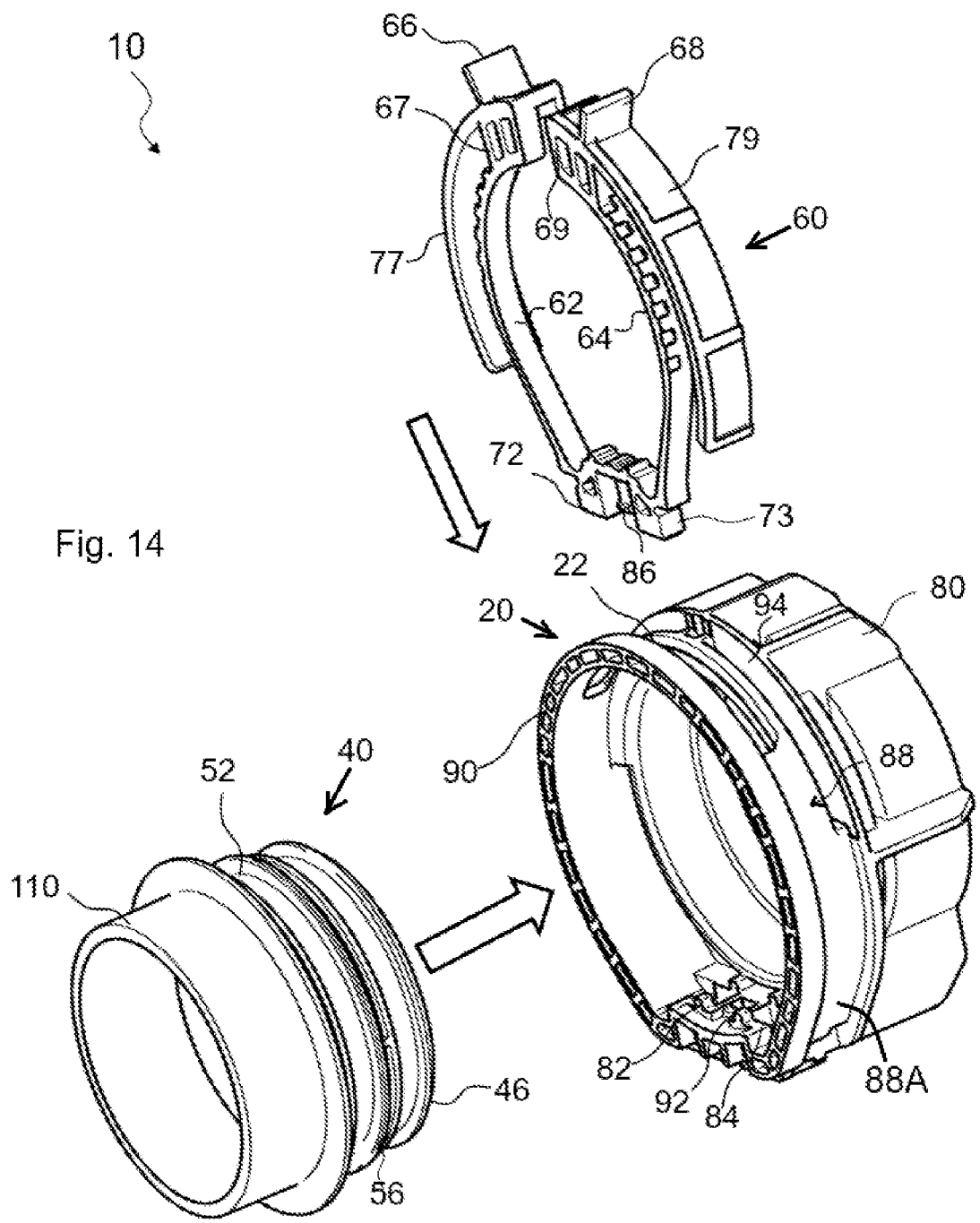
FIG. 14 is an exploded illustration of a coupling device according to a further embodiment of the invention with a separate locking element.
Figures 15, 16:
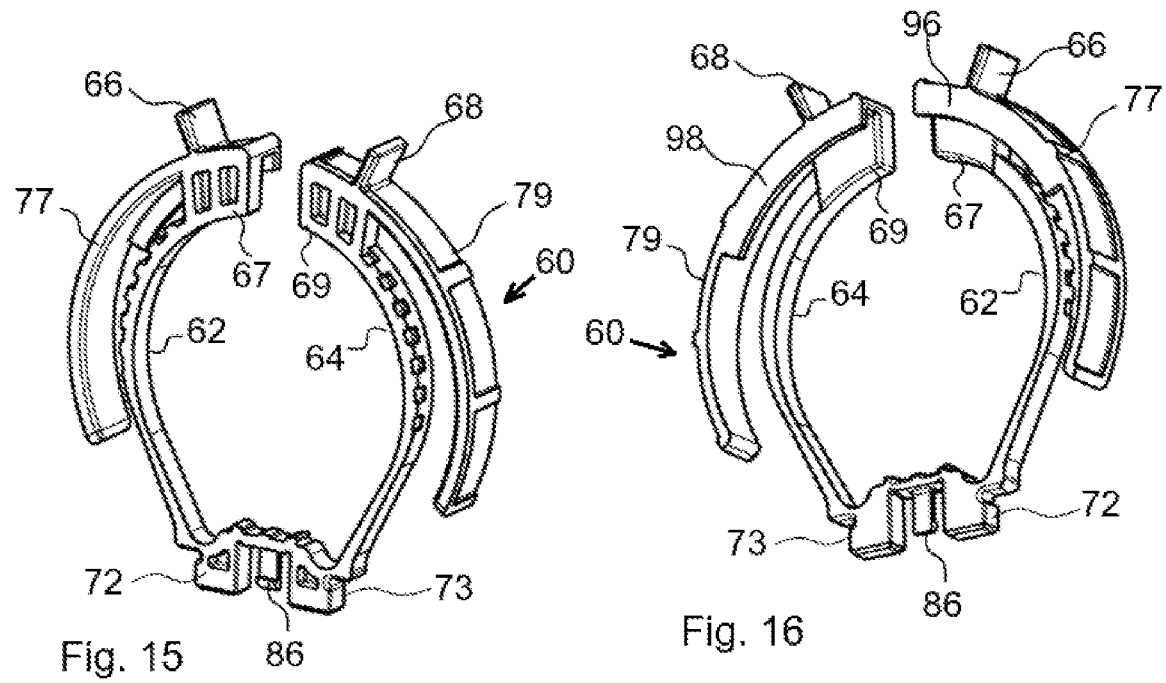
FIG. 15 is an isometric view of the locking element of the coupling device according to FIG. 14.
FIG. 16 is an isometric view of the locking element of the coupling device according to FIG. 14 from the rear.

FIG. 14 shows an exploded illustration of a coupling device 10 according to a further embodiment of the invention with a separate locking element 60. In this context, the locking element 60 is illustrated in FIGS. 15 and 16 in a respective isometric view of both sides of the locking element 60.

The locking element 60 for the coupling device 10 comprises two locking arc sections 62, 64 which are at least partially matched to the circumference of the coupling section 20. In the mounted state, they interact as intended with at least one corresponding locking section 52 that extends at least partially circumferentially on the circumference of the other coupling section 40 in such a way that, in the mounted state of the coupling sections 20, 40, an axial movement between the coupling sections 20, 40 can be limited. The locking element 60 has moreover two connecting sections 72, 73 for attachment to one of the coupling sections 20, 40 as well as in particular at least one snap element 86 for securing against release from said one coupling section 20, 40. As shown on FIGS. 14 and 15, the locking element 60 has a snap element 86 arranged between the two connection sections 72, 73 and connected to the two connecting section 72, 73.

In this embodiment of the coupling device 10, the locking element 60 is embodied as a separate component and can be inserted into one of the coupling sections 20 and preferably axially fixed by means of the connecting section 72, 73. Furthermore, the locking element 60 can be secured by means of the snap element 86, which is embodied as a snap hook, at the coupling section 20 against accidental release.

The support sections 77, 79 are embodied as circumferentially extending spring elements and are supported on an outer circumference of said one coupling section 20, when properly mounted.

In the embodiment illustrated in FIG. 14, the locking element 60 can be inserted through the slot-shaped circumferential opening 22 into the coupling section 20 in the direction of the illustrated arrow. The coupling section 20 is illustrated as part of a housing 80 and forms the outer one of the coupling sections 20, 40. The locking element 60 is inserted with the two pin-shaped connecting sections 72, 73 in corresponding receptacles 82, 84 of the coupling section 20 and is thus stably connected with the coupling section 20.

In addition, the snap element 86, embodied as a snap hook, locks in a corresponding counterpart snap element 92 of the coupling section 20. In this way, the locking element 60 is secured against accidental release that may result from the connecting sections 72, 73 sliding out of the receptacles 82, 84. By an additional pressure from below onto the connecting section 72, 73, the securing force of the snap element 86 may however be overcome and the snap element 60 may thus be released again from the locking action, without using a tool and without causing destruction, in order to pull it out of the coupling section 20.

In the mounted state of the locking element 60, the two support regions 77, 79 which are formed as spring arms are tightly resting proximate to the bottom wall 88A in the circumferential groove 88 of the coupling section 20 and are thus supported on the outer circumference of the coupling section 20. In this way, the two locking arc sections 62, 64 are held in their normal position and secured against spreading apart. The support regions 77, 79 are connected through the support regions 67, 69 to the locking arc sections 62, 64. By spreading apart the actuating elements 66, 68 which are arranged at the support regions 67, 69, the locking arc section 62, 64 can be spread apart. In this context, the closing force of the support regions 77, 79, which is exerted by the support regions 77,79 being supported at the outer circumference of the coupling section 20 in the circumferential groove 88, must be overcome.

The locking element 60 comprises two support elements 96, 98 which extend in circumferential direction, as can be seen in particular in FIG. 16. In the mounted state, the support elements 96, 98 can interact for axial securing with a corresponding support groove 94 that extends circumferentially at least partially on the circumference of the coupling section 20. In this context, the support elements 96, 98 absorb forces on the locking arc sections 62, 64 in pull-out direction L (see FIG. 22) and transmit them to the coupling section 20 or the housing 80 so that these forces must not be supported by the annular end face 90 of the coupling section 20 alone.

When the locking element 60 is mounted, the coupling section 40 which is arranged at the end of the pipe 110 can be pushed into the coupling section 20 in the direction of the arrow through the free opening which is formed by the locking arc sections 62, 64. In this context, the locking arc sections 62, 64 are slightly spread apart until the locking arc sections 62, 64 come to rest in the locking section 52 of the coupling section 40, whereby the coupling section 40 is connected with the coupling section 20. The seal 56 arranged on the outer circumference of the coupling section 40 seals in this context the coupling device 10 relative to the environment. The stop 46 can assist in precise positioning of the coupling section 40 in the coupling section 20 during assembly.

Figure 17:
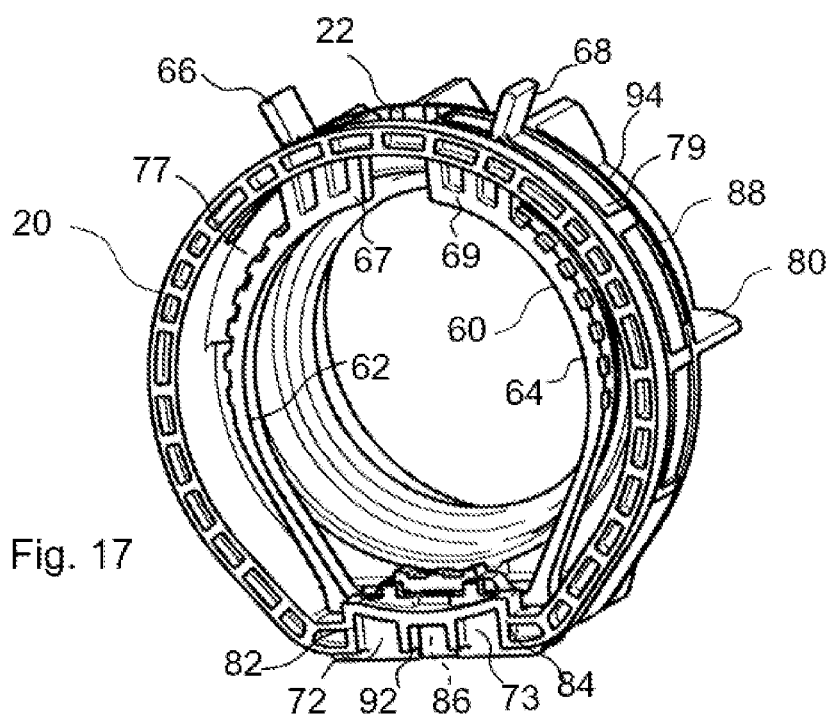
FIG. 17 is an isometric view of a coupling section of the coupling device according to FIG. 14 with mounted locking element.

FIG. 17 shows in this context an isometric view of the coupling section 20 of the coupling device 10 according to FIG. 14 with mounted locking element 60. In this context, the locking element 60 has been pushed through the opening 22 into the coupling section 20, and the connecting sections 72, 73 of the locking element 60 are inserted into the receptacles 82, 84 of the coupling section 20. In addition, the snap element 86 locks at the counterpart snap element 92 and secures in this way the locking element 60 against accidental release from the coupling section 20. In the mounted state, the support regions 77, 79 of the locking element 60 are positioned in the circumferential groove 88 and are supported in the circumferential groove 88. The spring force against opening of the locking arc section 62, 64 is produced in this way.

Figure 18:
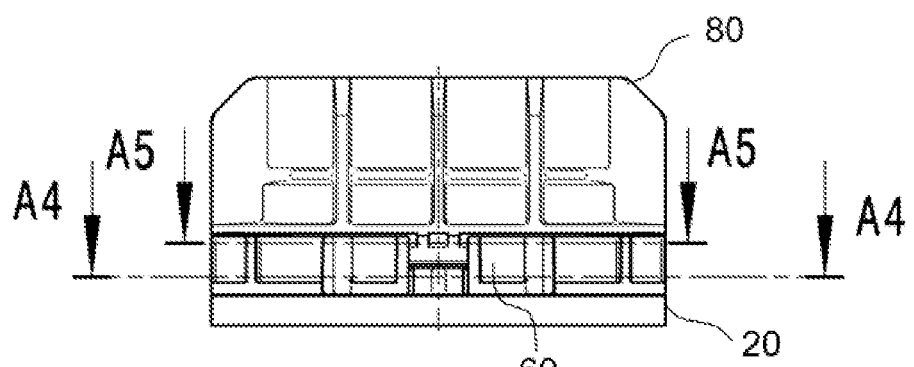
FIG. 18 shows a plan view of the coupling section according to FIG. 17 with illustrated section planes A4-A4 and A5-A5.
Figures 19, 20:
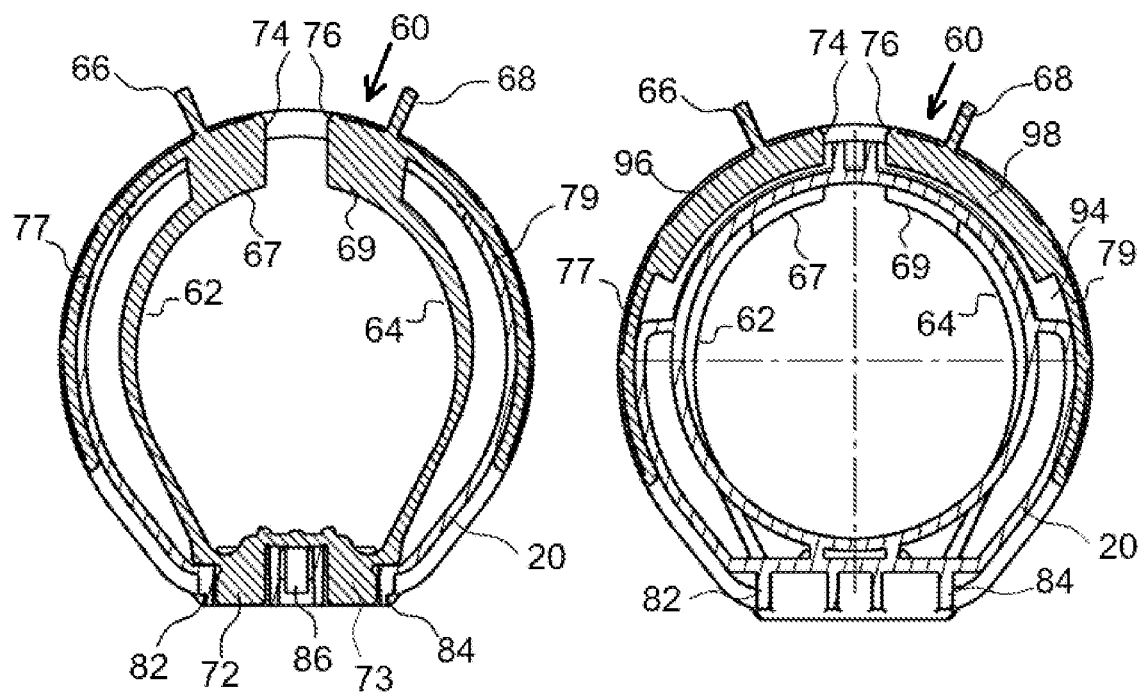
FIG. 19 shows a longitudinal section of the coupling section according to FIG. 18 along the section line A4-A4.
FIG. 20 shows a longitudinal section of the coupling section according to FIG. 18 along the section line A5-A5.

In FIG. 18, a plan view of the coupling section 20 with mounted locking element 60 according to FIG. 17 is illustrated with illustrated section planes A4-A4 and A5-A5. FIG. 19 shows a longitudinal section of the coupling section 20 according to FIG. 18 along the section line A4-A4 while FIG. 20 shows a longitudinal section of the coupling section 20 according to FIG. 18 along the section line A5-A5. In this way, different sections of the locking element 60 in the mounted state are illustrated.

In FIG. 19, the engagement of the connecting elements 72, 73 of the locking element 60 in the corresponding receptacles 82, 84 of the coupling section 20 can be seen. Furthermore, the snap element 86 is shown. The locking arc sections 62, 64 as well as the support regions 67, 69 and 77, 79 can be seen in section as well as the actuating elements 66, 68 which are arranged opposite each other in the region of the free ends 74, 76.

In contrast thereto, in FIG. 20, in the foreground the sectioned support elements 96, 98 can be seen which are arranged at the support regions 77, 79 and which dip into the support groove 94. The sectioned structure of the coupling section 20 is illustrated with the receptacles 82, 84. The locking arc sections 62, 64 with the support regions 67, 69 can be seen in the background.

Figures 21, 22:
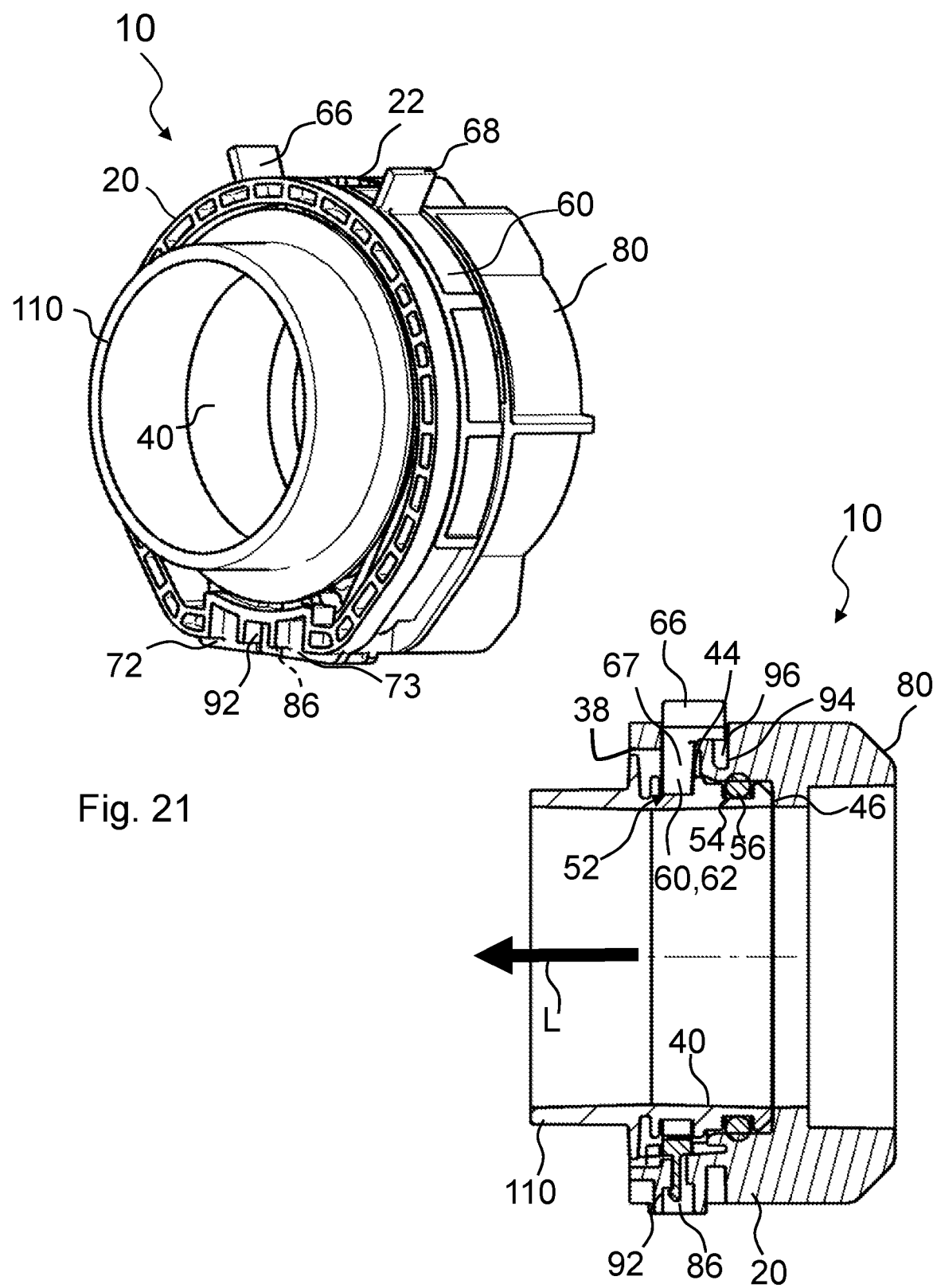
FIG. 21 is an isometric view of the coupling device according to FIG. 14 in mounted state.
FIG. 22 shows a longitudinal section of the coupling device according to FIG. 21.

FIG. 21 shows an isometric view of the coupling device 10 according to FIG. 14 in mounted state while in FIG. 22 a longitudinal section of the coupling device 10 according to FIG. 21 is illustrated.

In FIG. 21, the coupling section 40 is inserted into the coupling section 20 in which the locking element 60 is mounted. In this way, the coupling device ensures a seal-tight connection of the two coupling sections 20, 40 which, for example, can connect a housing 80 at one side with a pipe 110, in particular of an air conducting arrangement.

In longitudinal section in FIG. 22, the details of the individual connecting elements can be seen. In the mounted state of the coupling device 10, the coupling section 40 is inserted up to the stop 46 into the coupling section 20. In case of a force acting in the pull-out direction L, the locking ring 60 is contacting the coupling section 20, 40. The radial seal 56 arranged in the sealing groove 54 seals the two coupling sections 20, 40 relative to each other. The coupling section 40 is fixed by the locking element 60 fastened in the coupling section 20 against release in pull-out direction L. In this context, the locking arc sections 62, 64 which are connected by the support regions 67, 69 with the actuating elements 66, 68 are resting against the locking section 52 of the coupling section 40. The locking section 52 is embodied as a circumferential, radial inwardly oriented shoulder 44 opposite to the pull-out direction L of the coupling section 40 wherein the locking arc section 62, 64 in properly mounted state is resting against the locking section 52 and supported against the pull-out direction L.

The support elements 96, 98 dip into the support groove 94 of the coupling section 20 and thereby absorb possibly occurring pull-out forces which may act on the locking element 60 and transmit them to the coupling section 20.

The snap element 86 of the locking element 60 is locked at the counterpart locking element 92 of the coupling section 20 and secures in this way the locking element 60 against accidental release from the coupling section 20.

Figure 23:
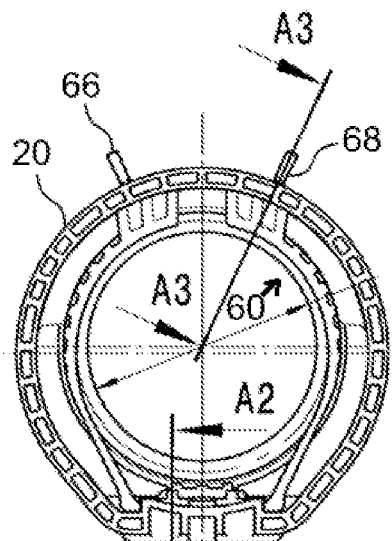
FIG. 23 shows a plan view of the coupling section with mounted locking element according to FIG. 17 with illustrated section planes A2-A2 and A3-A3.

FIG. 23 shows a plan view of the coupling section 20 with mounted locking element 60 according to FIG. 17 with illustrated section planes A2-A2 and A3-A3.

Figure 24:
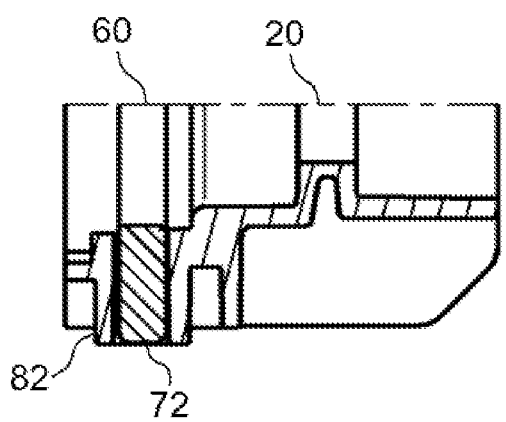
FIG. 24 shows a longitudinal section of the coupling section with mounted locking element according to FIG. 23 along the section line A2-A2.

In FIG. 24, in this context, a longitudinal section of the coupling section 20 with mounted locking element 60 along the section line A2-A2 according to FIG. 23 is illustrated, with the focus on the connection between locking element 60 and coupling section 20. In this context, one of the connecting sections 72 can be seen which is inserted into the corresponding receptacle 82 of the coupling section 20. With a corresponding embodiment of the contact surfaces of connecting section 72 and receptacle 82, the required forces between locking element 60 and coupling section 20 can thus be transmitted.

Figure 25:
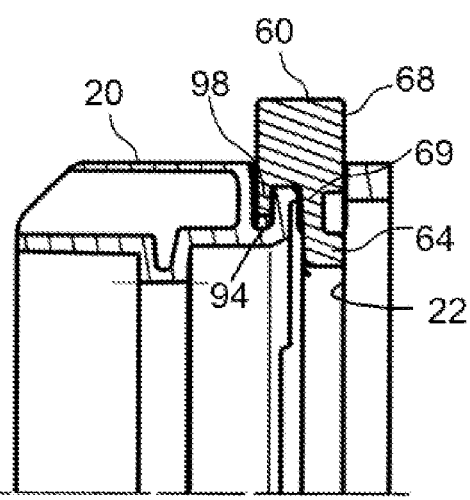
FIG. 25 shows a longitudinal section of the coupling section with mounted locking element according to FIG. 23 along the section line A3-A3.

In FIG. 25, a longitudinal section of the coupling section 20 with mounted locking element 60 along the section line A3-A3 according to FIG. 23 is illustrated, with focus on the upper part of the locking element 60 in the region of the actuating element 68. The locking element 60 dips with the locking arc section 64 into the slot-shaped circumferential opening 22. The support element 98 is positioned in the support groove 94 of the coupling section 20 in order to transmit and support forces in the pull-out direction L.

Figure 26:
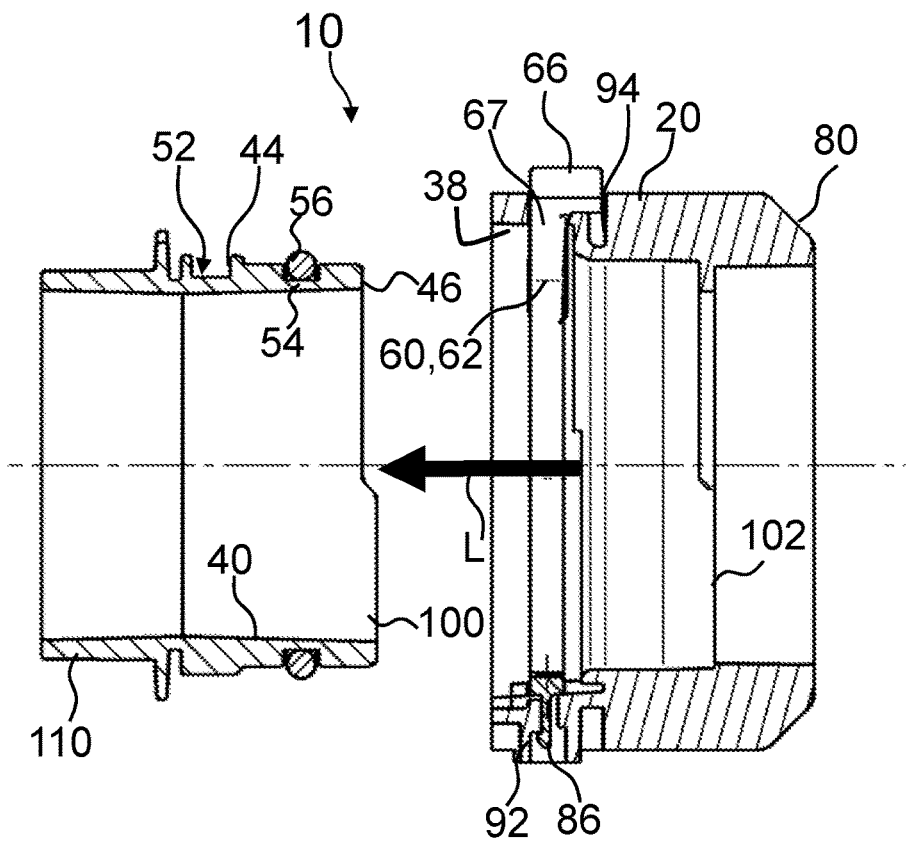
FIG. 26 shows a longitudinal section of a coupling device according to a further embodiment in released state.
Figure 27:
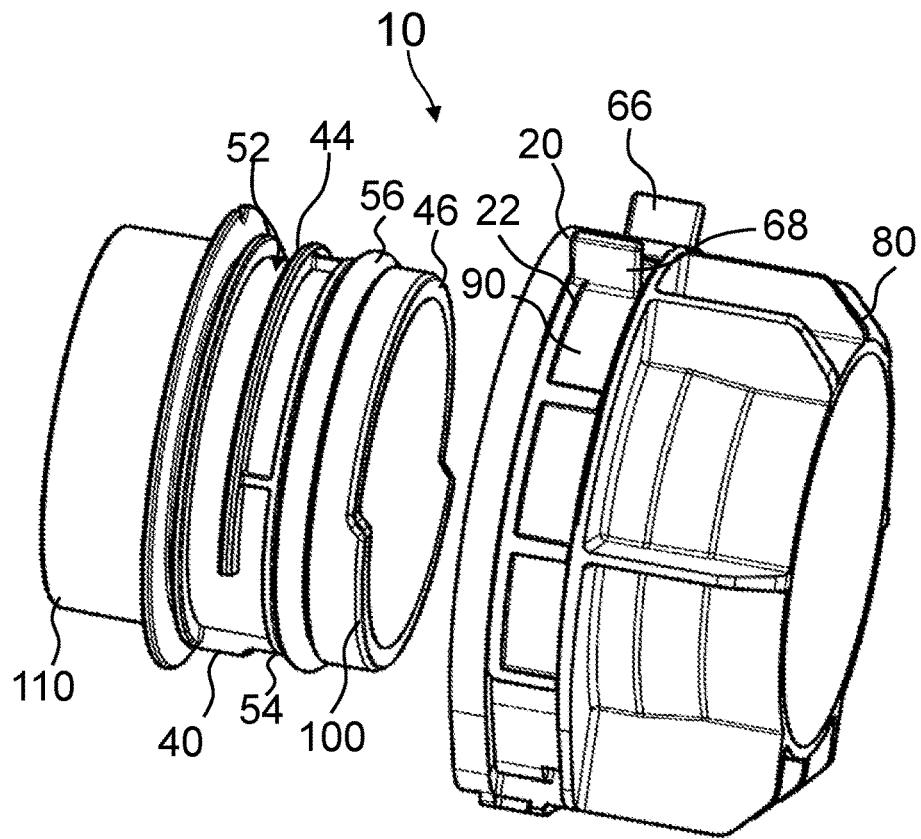
FIG. 27 is an isometric view of the coupling device according to FIG. 26.
Figure 28:
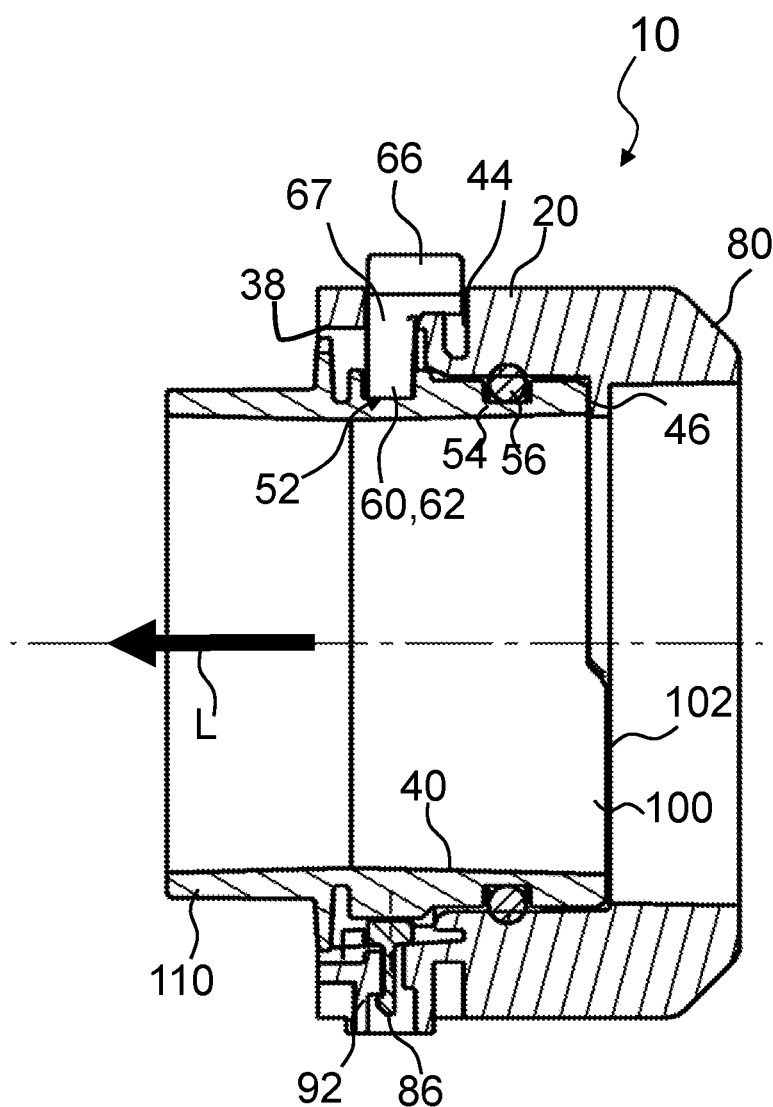
FIG. 28 shows a longitudinal section of the coupling device according to FIG. 26 in mounted state.

FIG. 26 shows a longitudinal section of the coupling device 10 according to a further embodiment in the released state in which the coupling section 40 is shown pulled out of the coupling section 20. In FIG. 27, an isometric view of the coupling device 10 according to FIG. 26 is shown in this context. In FIG. 28, a longitudinal section of the coupling device 10 according to FIG. 26 in mounted state is shown.

In order to avoid unnecessary repetitions, only the differences to the embodiment illustrated in FIGS. 14 to 25 will be discussed.

The coupling section 40 in the embodiment illustrated in FIG. 26 comprises a guide element 100 which is interacting with a counterpart guide element 102 of the other coupling section 20 and is positionable diametrically opposed to the free ends 74, 76 of the locking arc sections 62, 64. The guide element 100 secures in this way the coupling section 40 in the mounted state against tilting about a longitudinal axis. The guide element 100 is realized as a tubular extension of the coupling section 40 and is formed about half the pipe circumference, while the counterpart guide element 102 forms the complementary counterpart thereto in the coupling section 20. When the coupling section 40 is pushed into the coupling section 20, the guide element 100 and counterpart guide element 102 mesh with each other. Accordingly, it is only possible to close the coupling device 10 in this position of the coupling sections 20, 40. A rotation of coupling section 40 relative to coupling section 20 about the axial direction is thus not possible.

The guide element 100 is arranged opposite to the free ends 74, 76 of the locking arc sections 62, 64 where the essential fixation of the coupling section 40 is realized by contacting of the locking arc sections 62, 64 in the locking section 52 formed by the shoulder 44. In this way, the guide element 100 secures against tilting of the coupling section 40 relative to the coupling section 20 about the longitudinal axis and thus against accidental release of the coupling section 40 out of the coupling device 10. A tilting of the coupling section 40 is therefore not possible anymore or at least possible only to a very limited degree so that the release from the coupling device 10 can be prevented.

What is claimed is:

1. A coupling device for connecting media-conducting lines, the coupling device comprising:
   a one-part or multi-part first coupling section, wherein the first coupling section is an outer coupling section, the first coupling section having:

a circumferential groove formed into a radially outer surface of a circumferential wall of the first coupling section, the circumferential groove having
a bottom wall forming a radial bottom of the circumferential groove;
a slot-shaped opening extending through a first portion of the bottom wall of the circumferential groove and opening into an interior of the first coupling section;
at least one support groove formed in the bottom wall of the circumferential groove adjacent to and spaced away from the slot-shaped opening;
a locking element embodied as a unitary one piece component, comprising:
a first locking arc section formed as a first arcuate spring arm extending in a circumferential direction of the locking element;
a second locking arc section formed as a second arcuate spring arm extending in the circumferential direction of the locking element;
at least one connecting section arranged between and joining a first end of the first locking arc section to a first end of the second locking arc section;
the locking element further comprising:
a first arcuate circumferentially extending spring arm connected to a second end of the first locking arc section and arranged radially outward from the first locking arc section;
a second arcuate circumferentially extending spring arm connected to a second end of the second locking arc section and arranged radially outward from the second locking arc section;
wherein the first arcuate circumferentially extending spring arm and the second arcuate circumferentially extending spring arm further comprise
a support element formed as a radially inwardly projecting wall projecting radially inwardly from at least one of the arcuate circumferentially extending spring arms and configured to dip into the at least one support groove to absorb pull-out forces acting on the locking element and transmit them to the one-part or multi-part first coupling section;
wherein, when in the installed state of the locking element, the first arcuate circumferentially extending spring arm and the second arcuate circumferentially extending spring arm are received into and resting in the circumferential groove of the first coupling section, the arcuate circumferentially extending spring arms extending in a circumferential direction in the circumferential groove on the circumferential outer wall of the first coupling section, with the support element received into the at least one support groove.

2. The coupling device according to claim 1, wherein the locking element further comprises:
a first actuating element formed in one piece with the first locking arc section, and projecting outwardly away from the locking element;
wherein the first actuating element is connected to the first locking arc section through the slot-shaped opening of the first coupling section;
a second actuating element formed in one piece with the second locking arc section, and projecting outwardly away from the locking element;
wherein the second actuating element is connected to the second locking arc section through the slot-shaped opening of the first coupling section.

3. The coupling device according to claim 2, wherein when in the installed state of the locking element, the actuating elements are arranged on an exterior side of the first coupling section and are operable to spread apart the first locking arc section from the second locking arc section, thereby expanding a diameter of the locking element, thereby unlocking the locking element and permitting the first coupling section to be disconnected from the second coupling section.

4. The coupling device according to claim 3, wherein, for intended mounting, the locking element is reversibly expandable in diameter by inserting the second coupling section into the first coupling section.

5. The coupling device according to claim 2, wherein each actuating element is arranged adjacent to the second end of a respective one of the locking arc sections on which it is connected.

6. The coupling device according to claim 1, wherein the locking element further comprises:
at least one snap element, formed as a snap hook, is formed on the at least one connecting section;
wherein the first coupling section further comprises:
a counterpart snap locking element arranged on an interior of the circumferential wall of the first coupling section;
wherein the at least one snap element engages with the counterpart snap locking element to secure the locking element against release from the first coupling section;
wherein the at the at least one snap element is operable to disengage with the counterpart snap locking element to release the locking element from the first coupling section;
wherein the at least one connecting section is at least two connecting sections;
wherein the locking element has the snap hook arranged between the at least two connecting sections and connected to the at least two connecting sections.

* * * * *